United States Patent
Walsh et al.

(10) Patent No.: US 9,946,692 B2
(45) Date of Patent: Apr. 17, 2018

(54) PACKAGE FILE PRESENTATION

(75) Inventors: Daniel Walsh, San Francisco, CA (US);
Amy Poling, San Jose, CA (US);
Randy L. Swineford, San Jose, CA (US);
Marissa Dulaney, Morgan Hill, CA (US);
Robert K. McAfee, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 634 days.

(21) Appl. No.: 12/123,624

(22) Filed: May 20, 2008

(65) Prior Publication Data
US 2014/0033046 A1    Jan. 30, 2014

(51) Int. Cl.
*G06F 3/048* (2013.01)
*G06F 17/22* (2006.01)

(52) U.S. Cl.
CPC .................. *G06F 17/2229* (2013.01)

(58) Field of Classification Search
USPC .................. 715/730, 744, 835, 234
See application file for complete search history.

(56) References Cited

U.S. PATENT DOCUMENTS

| | | |
|---|---|---|
| 5,706,457 A | 1/1998 | Dwyer et al. |
| 6,237,011 B1 | 5/2001 | Ferguson et al. |
| 6,278,455 B1 | 8/2001 | Baker |
| 6,292,186 B1 | 9/2001 | Lehman et al. |
| 6,304,897 B1 | 10/2001 | Venkatraman et al. |
| 6,636,246 B1 | 10/2003 | Gallo et al. |

(Continued)

FOREIGN PATENT DOCUMENTS

| | | |
|---|---|---|
| WO | WO-2009045679 A1 | 4/2009 |
| WO | WO-2009143139 A2 | 11/2009 |

OTHER PUBLICATIONS

"37 Signals. This is Signal vs. Noise, a weblog by 37 signals about design, business, experience, simplicity, the web, culture, and more." *Cover Flow and the scrolling horizontal subnav at the new Apple.com—(37signals*, [Online] Retrieved from the internet: May 15, 2008 <URL:http://www.37signals.com/svn/posts/464-cover-flow-and-the-scrolling-horizontal-subnav-a . . . >, 18 pages.

(Continued)

*Primary Examiner* — Tadeese Hailu
*Assistant Examiner* — Darrin Hope
(74) *Attorney, Agent, or Firm* — Shook, Hardy & Bacon L.L.P.

(57) ABSTRACT

Various embodiments illustrated and described herein include one or more of systems, methods, software, and data structures for package file presentation. Some embodiments include receiving a package file including a presentation specification, one or more content files, and metadata defining display elements within the presentation specification and associating each display element with one of the content files. The package file may then be presented by instantiating the presentation specification as a function of executable code embedded within the presentation specification. Some embodiments further include instantiating each display element, each display element including a link to an associated content file within the package file and to generate and distribute display elements within a graphical user interface.

24 Claims, 25 Drawing Sheets

(56) References Cited

U.S. PATENT DOCUMENTS

| | | | |
|---|---|---|---|
| 7,013,435 B2 | 3/2006 | Gallo et al. | |
| 7,031,968 B2 | 4/2006 | Kremer et al. | |
| 7,035,880 B1 | 4/2006 | Crescenti et al. | |
| 7,076,728 B2 | 7/2006 | Davis et al. | |
| 7,089,248 B1* | 8/2006 | King et al. | |
| 7,139,977 B1 | 11/2006 | Russell | |
| 7,412,650 B2 | 8/2008 | Gallo | |
| 7,506,359 B1 | 3/2009 | Ling | |
| 7,526,726 B1 | 4/2009 | Skwarecki et al. | |
| 7,603,615 B2 | 10/2009 | Lee et al. | |
| 7,634,775 B2 | 12/2009 | McLuckie et al. | |
| 7,823,064 B1 | 10/2010 | Levy | |
| 7,913,053 B1 | 3/2011 | Newland | |
| 8,479,087 B2 | 7/2013 | Swineford et al. | |
| 8,566,711 B1 | 10/2013 | Srivastava | |
| 2002/0059337 A1 | 5/2002 | Takaoka et al. | |
| 2002/0073058 A1 | 6/2002 | Kremer et al. | |
| 2002/0147735 A1 | 10/2002 | Nir | |
| 2003/0033296 A1 | 2/2003 | Rothmuller et al. | |
| 2003/0066027 A1 | 4/2003 | Nakagiri | |
| 2003/0115171 A1 | 6/2003 | Mangalvedhekar | |
| 2003/0196120 A1 | 10/2003 | Raley et al. | |
| 2004/0004636 A1 | 1/2004 | van Driel | |
| 2004/0049513 A1 | 3/2004 | Yakir et al. | |
| 2004/0201668 A1* | 10/2004 | Matsubara et al. | 348/14.05 |
| 2004/0205633 A1 | 10/2004 | Martinez et al. | |
| 2004/0210535 A1 | 10/2004 | Erickson | |
| 2004/0215657 A1* | 10/2004 | Drucker et al. | 707/104.1 |
| 2005/0151756 A1 | 7/2005 | Miyamoto et al. | |
| 2005/0165726 A1 | 7/2005 | Kawell et al. | |
| 2005/0177389 A1 | 8/2005 | Rakowicz | |
| 2005/0193330 A1 | 9/2005 | Peters | |
| 2005/0209955 A1 | 9/2005 | Underwood et al. | |
| 2005/0210416 A1* | 9/2005 | MacLaurin et al. | 715/851 |
| 2005/0216532 A1 | 9/2005 | Lallier | |
| 2005/0268217 A1 | 12/2005 | Garrison | |
| 2006/0080269 A1* | 4/2006 | MacLaurin | 706/45 |
| 2006/0156228 A1 | 7/2006 | Gallo et al. | |
| 2006/0161863 A1 | 7/2006 | Gallo | |
| 2006/0178215 A1 | 8/2006 | Lehikoinen et al. | |
| 2006/0184540 A1 | 8/2006 | Kung et al. | |
| 2006/0206807 A1 | 9/2006 | Rosner et al. | |
| 2006/0291504 A1 | 12/2006 | Cohn | |
| 2007/0016546 A1 | 1/2007 | De Vorchik et al. | |
| 2007/0033237 A1 | 2/2007 | Prahlad et al. | |
| 2007/0050412 A1 | 3/2007 | Robertson et al. | |
| 2007/0067362 A1 | 3/2007 | McArdle | |
| 2007/0162953 A1 | 7/2007 | Bolliger et al. | |
| 2007/0168374 A1 | 7/2007 | Bourne et al. | |
| 2007/0192739 A1* | 8/2007 | Hunleth et al. | 715/823 |
| 2007/0204211 A1 | 8/2007 | Paxson | |
| 2007/0226204 A1 | 9/2007 | Feldman | |
| 2007/0240079 A1 | 10/2007 | Flynt et al. | |
| 2008/0001946 A1 | 1/2008 | Ishikawa | |
| 2008/0028333 A1 | 1/2008 | Perelman et al. | |
| 2008/0034381 A1* | 2/2008 | Jalon et al. | 719/329 |
| 2008/0130966 A1 | 6/2008 | Crucs | |
| 2008/0163122 A1 | 7/2008 | Wolf | |
| 2009/0089656 A1 | 4/2009 | McAfee et al. | |
| 2009/0217173 A1* | 8/2009 | Manheimer | 715/744 |
| 2009/0292980 A1 | 11/2009 | Swineford et al. | |
| 2010/0057765 A1 | 3/2010 | Dispensa et al. | |
| 2010/0057884 A1 | 3/2010 | Brownell et al. | |
| 2010/0306283 A1 | 12/2010 | Johnson et al. | |

OTHER PUBLICATIONS

"CreativSpace image search—finally a cool image search", [Online] Retrieved from the internet: May 15, 2008 <URL:http://creativspace.at/>, 1 page.

"Dynamic PageFlip 3.4", [Online] Retrieved from the internet: Apr. 15, 2008 <URL:http://www.pageflip.hu/>, 2 pages.

"Great cover version", *Apple—iTunes—iTunes Jukebox—Cover Flow*, [Online] Retrieved from internet: May 19, 2008 <URL:http://www.apple.com/itunes/jukebox/coverflow.html>, 1 page.

"POD Tech Combine PDF's", Adobe Acrobat 8 Packages: Combine PDFs | PodTech.net, [Online] Retrieved from the internet: Apr. 15, 2008 <URL:http://www.podtech.net/home/1761/adobe-acrobat-8-packages-combine-pdfs>,(Dec. 29, 2006),2 pages.

Del Strother, Jonathan , et al., "Cover Flow", From Wikipedia, the free encyclopedia (Redirected from Cover flow), [Online] Retrieved from the internet: May 15, 2008 <URL:http://en.wikipedia.org/wiki/Cover_flow>,(Sep. 11, 2006),2 pages.

Graham, Jamey , et al., "iCandy: a Tangible User Interface for iTunes", Copyright is held by the author/owner(s). CHI 2008, Apr. 5, 2008, Florence, Italy. ACM 978-1-60558-012-8/08/04., (Apr. 5, 2008),6 pages.

"International Application Serial No. PCT/US2008/075388, International Search Report Mailed Jan. 13, 2009", 7 pgs.

"International Application Serial No. PCT/US2008/075388, Written Opinion mailed Jan. 13, 2009", 7 pgs.

"Open Packaging Format (OPDF) 2.0 v0.984", [Online]. Retrieved from the Internet: <URL:http://www.idpf.org/2007/opf/OPF_2.0_0.984_draft.html>, (Apr. 16, 2007), 35 pgs.

"Specifications for the Digital Talking Book", [Online]. Retrieved from the Internet: <URL:http://www.niso.org/workrooms/daisy/Z39-86-2005.pdf>, Navigation Control File (NCX), (Apr. 21, 2005), 43-56.

"International Application Serial No. P0CT/US2009/044496, Search Report mailed Jun. 3, 2010", 4 pgs.

"International Application Serial No. PCT/US2009/044496, Written Opinion mailed Jun. 3, 2010", 6 pgs.

"U.S. Appl. No. 11/864,694, Non-Final Office Action mailed Feb. 17, 2011", 21 pgs.

"U.S. Appl. No. 11/864,714, Non-Final Office Action mailed Feb. 16, 2011", 20 pgs.

Rice, F, "How to: Manipulate Office Open XML Formats Documents", http://web.archive.org/web/20070105053042/msdn2.microsoft.com/en-us/library/aa982683.aspx, (Dec. 2006).

Toub, S, "View Data your Way With Our Manage Preview Handler Framework", MSDN vol. 22 Issue 1., Available from: Computers & Applied Sciences Complete, Ipswich, MA. Accessed Feb. 11, 2011., (Jan. 2007), 52-67.

Zwicky, E D, "Further torture: more testing of backup and archives programs, in: Proceeding of The 17th Annual Large Installation Systems Administration Conference", LISA 2003, San Diego, CA, USA, (Oct. 2003), 7-14.

"U.S. Appl. No. 09/610,738, filed Jul. 6, 2000", 28 pgs.

"U.S. Appl. No. 11/864,694, Response filed Feb. 27, 2012 to Final Office Action mailed Aug. 31, 2011", 8 pgs.

"U.S. Appl. No. 11/864,714, Examiner Interview Summary mailed Nov. 29, 2011", 3 pgs.

"U.S. Appl. No. 11/864,714, Response filed Nov. 9, 2011 to Final Office Action mailed Aug. 5, 2011", 7 pgs.

"U.S. Appl. No. 11/864,714, Response filed Dec. 19, 2012 to Non-Final Office Action mailed Sep. 20, 2012", 7 pgs.

"U.S. Appl. No. 12/123,615, Final Office Action mailed Sep. 28, 2011", 28 pgs.

"U.S. Appl. No. 12/123,615, Non Final Office Action mailed Oct. 5, 2012", 29 pgs.

"U.S. Appl. No. 12/123,615, Response filed Jan. 7, 2013 to Non-Final Office Action mailed Oct. 5, 2012", 13 pgs.

"U.S. Appl. No. 12/123,615, Response filed Jan. 30, 2012 to Final Office Action mailed Sep. 28, 2011", 13 pgs.

"U.S. Appl. No. 12/123,635, Final Office Action mailed Nov. 22, 2011", 24 pgs.

"U.S. Appl. No. 12/123,635, Final Office Action mailed Dec. 6, 2012", 27 pgs.

"U.S. Appl. No. 12/123,635, Non Final Office Action mailed Jun. 7, 2012", 24 pgs.

"U.S. Appl. No. 12/123,635, Response filed Feb. 22, 2012 to Final Office Action mailed Nov. 22, 2011", 14 pgs.

"U.S. Appl. No. 12/123,635, Response filed Sep. 5, 2012 to Non-Final Office mailed Jun. 7, 2012", 14 pgs.

"U.S. Appl. No. 12/123,640, Final Office Action mailed Dec. 2, 2011", 32 pgs.

(56) References Cited

OTHER PUBLICATIONS

"U.S. Appl. No. 12/123,640, Response filed Jun. 1, 2012 to Non Final Office Action mailed Dec. 2, 2011", 10 pgs.
"U.S. Appl. No. 12/326,691, Examiner Interview Summary mailed Jun. 29, 2012", 3 pgs.
"U.S. Appl. No. 12/326,691, Final Office Action mailed Apr. 18, 2012", 42 pgs.
"U.S. Appl. No. 12/326,691, Non-Final Office Action mailed Nov. 15, 2011", 37 pgs.
"U.S. Appl. No. 12/326,691, Response filed Feb. 15, 2012 to Non-Final Office Action mailed Nov. 15, 2011", 11 pgs.
"U.S. Appl. No. 12/326,691, Response filed Jul. 16, 2012 to Final Office Action mailed Apr. 18, 2012", 12 pgs.
"U.S. Appl. No. 11/864,714, Non Final Office Action mailed Sep. 20, 2012", 14 pgs.
"U.S. Appl. No. 11/864,694, Final Office Action mailed Aug. 31, 2011", 18 pgs.
"U.S. Appl. No. 11/864,694, Response filed Jun. 16, 2011 to Non-Final Office Action mailed Feb. 17, 2011", 16 pgs.
"U.S. Appl. No. 11/864,714, Final Office Action mailed Aug. 5, 2011", 17 pgs.
"U.S. Appl. No. 11/864,714, Response filed May 16, 2011 to Non-Final Office Action mailed Feb. 16, 2011", 9 pgs.
"U.S. Appl. No. 12/123,615, Non-Final Office Action mailed May 27, 2011", 30 pgs.
"U.S. Appl. No. 12/123,615, Response filed Aug. 29, 2011 to Non-Final Office Action mailed May 27, 2011", 17 pgs.
"U.S. Appl. No. 12/123,635, Non Final Office Action mailed May 27, 2011", 19 pgs.
"U.S. Appl. No. 12/123,635, Response filed Aug. 29, 2011 to Non-Final Office Action mailed May 27, 2011", 12 pgs.
"U.S. Appl. No. 12/123,640 , Response filed Sep. 9, 2011 to Non Final Office Action mailed Jun. 9, 2011", 12 pgs.
"U.S. Appl. No. 12/123,640, Non-Final Office Action mailed Jun. 9, 2011", 28 pgs.
"U.S. Appl. No. 12/326,691, Response filed Sep. 1, 2011 to Restriction Requirement mailed Aug. 30, 2011", 9 pgs.
"U.S. Appl. No. 12/326,691, Restriction Requirement mailed Aug. 30, 2011", 6 pgs.
"The Microsoft Office Open XML Formats, Preview for Developers", Microsoft, (Jun. 2005), 1-21.
Bott, et al., "Special Edition Using Microsoft Office 2007", Que Publishing, (Dec. 22, 2006), 2 pgs.
Rice, Frank, "How to: Manipulate Office Open XML Formats Documents", Microsoft, [Online] Retrieved from the Internet: <http://msdn.microsoft.com/en-us/library/aa982683(d=printer,v=office.12).aspx> Accessed Mar. 2, 2011, (Dec. 2006), 1-25.
Notice of Allowance dated May 20, 2016 in U.S. Appl. No. 12/123,640, 9 pages.
"U.S. Appl. No. 11/864,714, Final Office Action mailed Apr. 17, 2013", 17 pgs.
"U.S. Appl. No. 12/123,615, Notice of Allowance mailed Mar. 1, 2013", 17 pgs.
"U.S. Appl. No. 12/123,615, Supplemental Notice of Allowance mailed Mar. 26, 2013", 5 pgs.
"U.S. Appl. No. 12/123,635, Examiner Interview Summary mailed Mar. 15, 2013", 3 pgs.
"U.S. Appl. No. 12/123,635, Response filed May 28, 2013 to Final Office Action mailed Dec. 6, 2012", 16 pgs.
"HyperCard: Installation and New Features", Apple Computers, (1998), 1-149.
"International Application Serial No. PCT/US08/75388, International Preliminary Report on Patentability mailed Apr. 8, 2010", 7 pgs.
Non-Final Office Action dated Nov. 8, 2017 in U.S. Appl. No. 14/468,233, 20 pages.

\* cited by examiner

FIG. 4

```
┌─ 400
%PDF-1.8
    1 0 OBJ
        % CALL TO PRESENTATION SPECIFICATION
    ENDOBJ 2 0 OBJ
        % PACKAGED SWF FILE WITH DISPLAY ELEMENT
        % METADATA DESCRIBING AND REFERENCING PACKAGED
        % FILES 1, 2, AND 3
    ENDOBJ 3 0 OBJ
        % PACKAGED FILE 1
    ENDOBJ 4 0 OBJ
        % PACKAGED FILE 2
    END OBJ 5 0 OBJ
        % PACKAGED FILE 3
    ENDOBJ 6 0 OBJ
        % IMAGE FILE REFERENCED BY THE PRESENTATION
        % SPECIFICATION
    ENDOBJ

TRAILER
        % INDEX TO OBJECTS
    END TRAILER

%%EOF
```

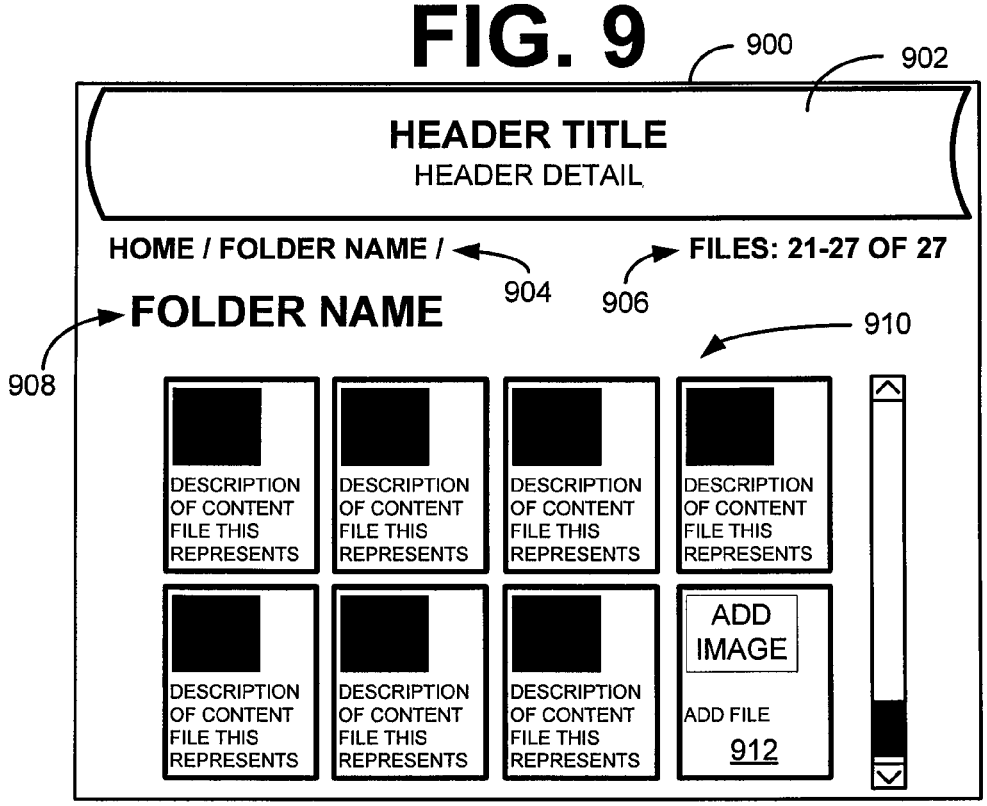
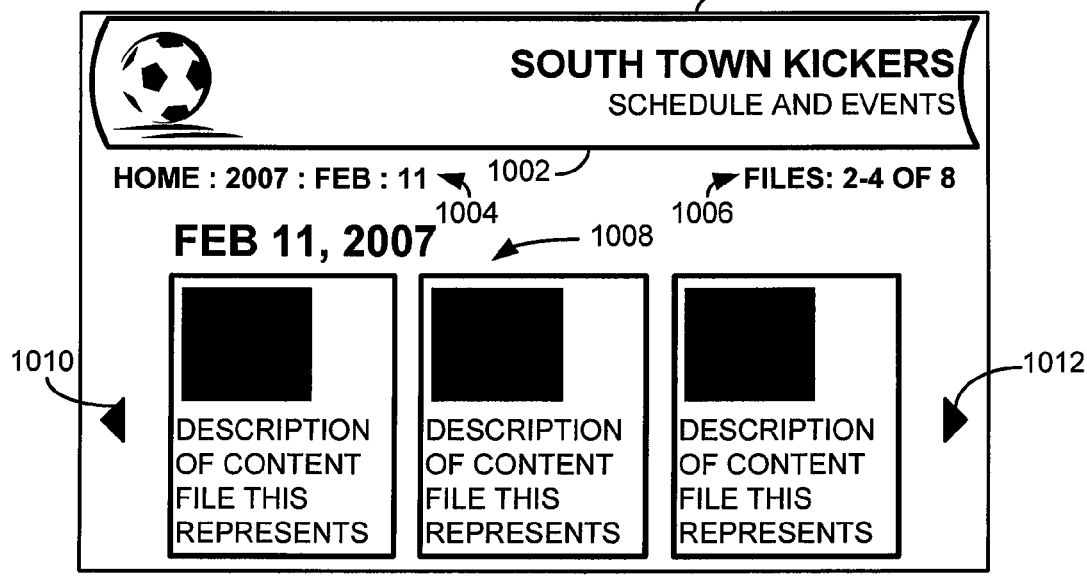

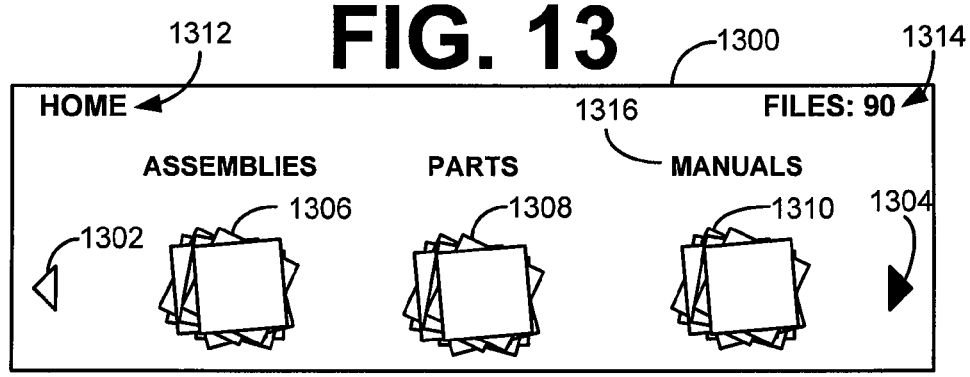
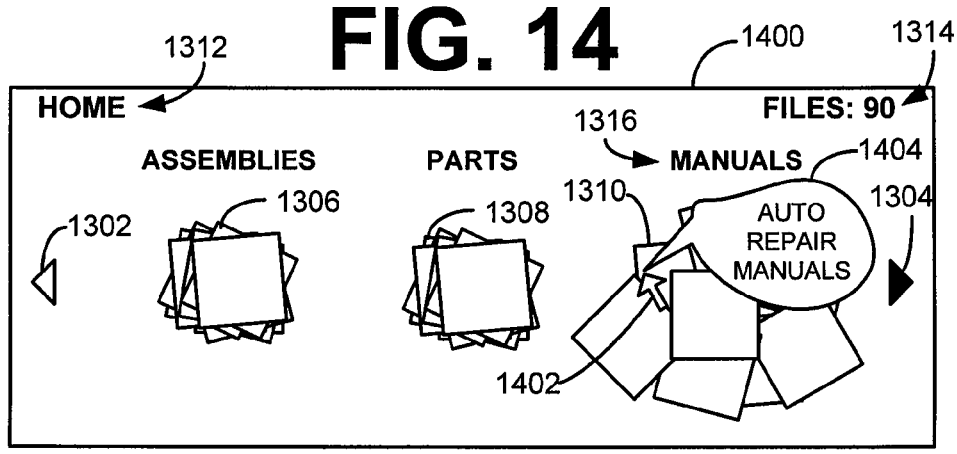
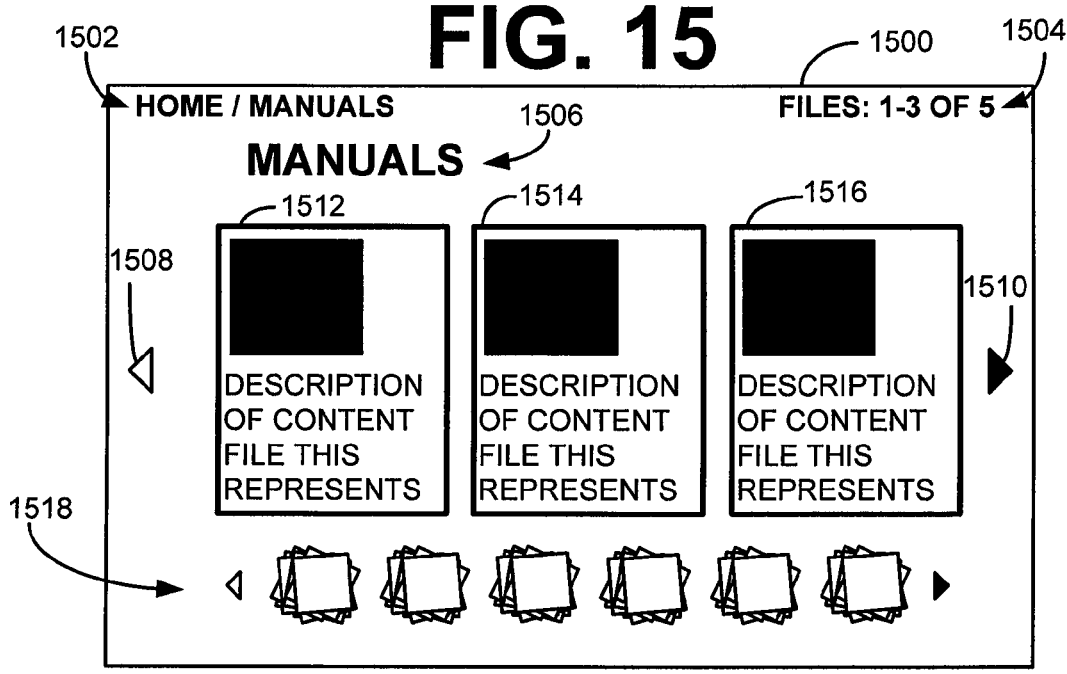

PACKAGE FILE PRESENTATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, Adobe Systems, Inc. All Rights Reserved.

BACKGROUND INFORMATION

Electronic documents (e.g., page description language documents) and other electronic content have become increasingly pervasive as the use of electronic computer systems and networks (e.g., the Internet) have grown. Increasingly, collections or bundles of electronic content are being generated and made available on electronic computer systems.

BRIEF DESCRIPTION OF THE DRAWINGS

Some embodiments are illustrated by way of example and not limitation in the figures of the accompanying drawings in which:

FIG. 4 is a pseudo code listing of a page description language document, according to an example embodiment.

FIG. 9 is a user interface illustration generated as a function of a presentation specification, according to an example embodiment.

FIG. 10 is a user interface illustration generated as a function of a presentation specification, according to an example embodiment.

FIG. 13 is a user interface illustration generated as a function of a presentation specification, according to an example embodiment.

FIG. 14 is a user interface illustration generated as a function of a presentation specification, according to an example embodiment.

FIG. 15 is a user interface illustration generated as a function of a presentation specification, according to an example embodiment.

DETAILED DESCRIPTION

Figure 1:
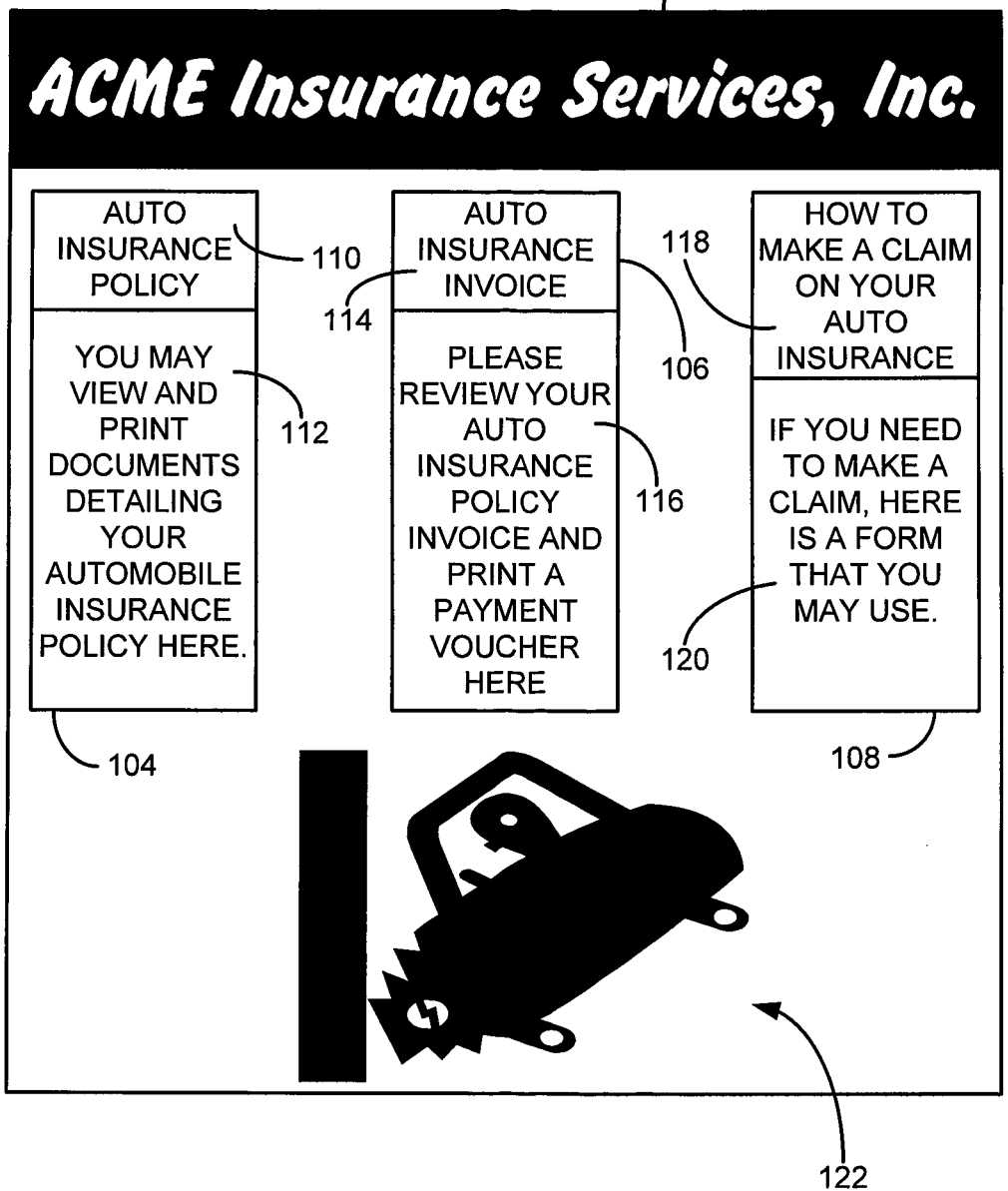
FIG. 1 is a user interface illustration, according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The functions or algorithms described herein are implemented in hardware, software or a combination of software and hardware. The software comprises computer executable instructions stored on computer-readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, application-specific integrated circuit (ASIC), microprocessor, or other type of processor operating on a system, such as a personal computer (PC), server, router, or other device capable of processing data, including network interconnection devices.

Some embodiments implement the functions in two or more specific interconnected hardware modules or devices with related control and data signals communicated between and through the modules, or as portions of an ASIC. Thus, the exemplary process flow is applicable to software, firmware, and hardware implementations.

Collections of content files may be bundled into a package file and presented in various ways. For example, considering page descriptor language documents, simple lists or as links for each content file of a package files may be presented within page description language documents, such as PDF documents. Although such presentation methods provide access to the packaged files, various embodiments described and illustrated herein provide more interactive ways to author and present package files. Some embodiments provide mechanisms by which rich descriptions of content files within a package may be presented, allowing a viewer to identify if particular content files are relevant for a particular need without even opening the particular content files. Some embodiments may allow a viewer to select a mode of presentation of a packaged file. Some embodiments allow content authors to include graphics, audio, moving images and videos, and views of package files within a presentation specification to provide graphical representations of content files included in package files. As an ancillary benefit, presentation specifications may be utilized to include branding information, such as company logos, information, product illustrations, and the like in an interactive presentation. In some further embodiments, a content file, or other element of a package file may optionally be linked to at another storage location, such as on a networked server.

In some embodiments, a view of a collection or group (e.g., package) of content files may be presented in a user interface using a customizable navigation template, which is referred to herein as a presentation specification. A presentation specification may be an object adapted to present one or more views of a package file. The views presented by a presentation specification may be user interactive and may include any of still images, animations, video, audio, and other forms of media. In some embodiments, a presentation specification may include unique package branding (e.g., a package of files delivered by a company may be branded using that company's branding). Some such embodiments are supported by the creation and visualization of metadata regarding the content files included in a package file. For example, the content file metadata may be automatically determined, such as file type, creation date, length etc., or it may also be user inputted, such as commentary and notes regarding the package as a whole or the individual content files included therein. In some embodiments, the metadata is independently embedded within the package file. In other embodiments, the metadata is embedded within content files packaged within the package file. The metadata, in some embodiments, may include location (e.g., geospatial) data associated with each content file and a background or reference image or animation upon which content files are to be displayed as a function of the location data.

Multiple presentation specifications may also be defined for a common package file. In addition, presentation specifications may be made available for package file views. For example, a particular company may publish a number of presentation specifications for various package files that are typically assembled by that organization, each of these presentation specifications including a custom navigation template and organization-specific branding.

In one example embodiment, a user interface of a presentation specification may be presented as columns, each column being dedicated to a particular content file in the package file, including metadata regarding a respective content file of the package file. In another embodiment, relationships between content files and the package file may be indicated. For example, a map may be created which indicates certain relationships that exist between content files in a package file.

Package files may be authored in several ways. Some embodiments provide user interfaces that may be manipulated to select one or more presentation specifications to include in a package file, to set various options, to define metadata, and to attach or otherwise associate content files with a package, such as via linking to content files accessible over a network. Some other embodiments provide mechanisms that may be used in a drag-and-drop fashion where a user may select content files to be packaged, such as in a file explorer-type user interface of an operating system, and drag-and-drop the content files into a package file user interface item, such as an icon. The user may then select one or more presentation specifications for use in displaying a representation of the content files. These and other embodiments are described in detail below.

FIG. 1 is a user interface 100 illustration, according to an example embodiment. The user interface 100 illustrates a view of a package file presented according to a presentation specification. The view of the package file includes a presentation of three content files created for a recipient. The presentation specification, when instantiated in the user interface 100, includes a header 102, a body including three columns 104, 106, 108, and a footer including an image 122. The package file, in some embodiments, is a page description language document, such as a PDF document.

The header 102, in this embodiment, includes a graphic of an entity (e.g., company, organization, or person) of origin of the package file. The graphic is instantiated from an image file that may also be packaged within the package file. However, in some embodiments, the image file may be referenced by an Internet address in metadata of the presentation specification. Thus, in the event the entity of origin modifies its image file, an updated image file may be stored to the Internet address and subsequent views of the package file using the presentation specification will display the modified image file.

The columns 104, 106, 108 of the body portion of the user interface 100 include a column for each of three content files, such as documents, included in the package file. The columns, in the example embodiment, each include a title 110, 114, 118 and a description 112, 116, 120. The titles and descriptions provide information to a viewer about a content file that may be viewed by selecting a respective column 104, 106, 108. For example, a user may desire to view information regarding the user's auto insurance policy. The user in such an example would select the left most column 104, such as by clicking a mouse on the column. Such a selection, in some embodiments, may cause the underlying content file to be displayed, such as in the user interface 200 of FIG. 2.

Figure 2:
FIG. 2 is a user interface illustration, according to an example embodiment.

FIG. 2 is a user interface 200 illustration, according to an example embodiment. The user interface 200 presents the auto insurance policy information content file that is referenced by metadata underlying the left most column 104 of the user interface 100 in FIG. 1. The user interface 200 includes a header 202 and a body 204. The header 202 in this embodiment includes the same image file of the header 102 in the user interface 100 of FIG. 1. However, this image file need not be the same. This user interface 200 may be defined in a manner completely independent of other user interfaces which may be configured to display other content files included a package file. However, each of the content files underlying the columns 104, 106, 108 of the user interface 100 of FIG. 1 may be configured for display in the user interface 200. The body 204 is an area within which a selected content file may be displayed. The pane in various embodiments may be utilized to present various content file types such as documents, video, images, text, and other file and media types.

The user interfaces 100 and 200 of FIG. 1 and FIG. 2 are merely examples of presentation specifications (e.g., in the form of a page description language document and/or executable code or scripts) that may be created, linked, and packaged together by developers and users. Further examples of presentation specifications are illustrated and described with regard to FIG. 3 and further with regard to FIG. 9 and several figures that follow. Note though that the only real limits on what such user interfaces may look like and how they may behave and be linked are relative to the scope of the presentation specification developer's imagination.

Figure 3:
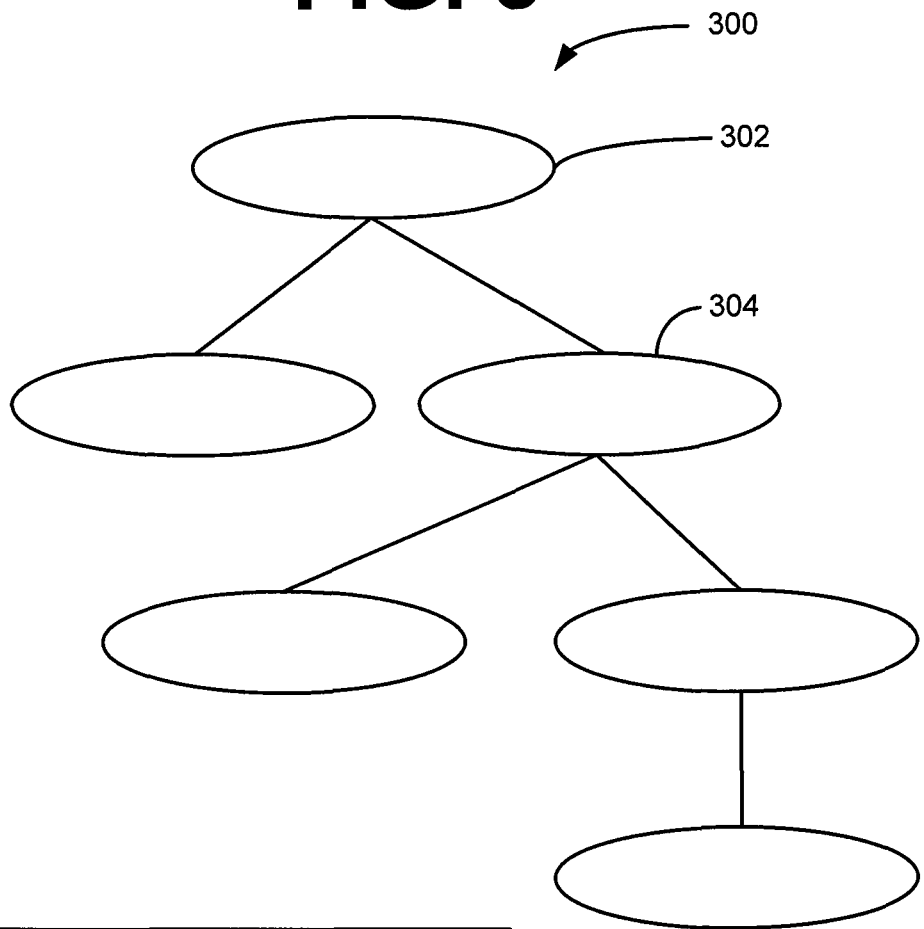
FIG. 3 is an illustration of a hierarchical presentation specification, according to an example embodiment.

For example, FIG. 3 is an illustration of a hierarchical display element presentation specification 300, according to an example embodiment. Such a hierarchical display element presentation specification 300 may include multiple display elements which may be expanded and contracted by a viewer in a hierarchical fashion when instantiated within a reader and/or player application. Such a hierarchical display element presentation specification 300 is therefore viewer interactive.

The example hierarchical display element presentation specification 300 includes a top-level display element 302 and multiple lower level display elements 304. In some embodiments, although the display elements may be at different levels in the hierarchy, each display element may include identical data elements. For example, the data elements of each display element, such as in the illustrated data structure 306 and data structures of other presentation specifications, may include:
- a display element name;
- a reference to a parent display element;
- a reference to a content file within a package file;
- referenced content file properties, such as file name, size, type, created date, and modified date;
- one or more icons or other images that may be used to represent the referenced content file within the presentation specification when instantiated;
- a description of the referenced content file; and
- a location in which to display the reference content file within the presentation specification.

In other embodiments, there may be fewer or greater numbers of data elements and the data elements may be different depending on what is specified by a presentation specification developer. Some or all of these data elements may be displayed within a respective display element, column, presentation specification hot spot, or other location specified within a presentation specification. In further embodiments, the display element 304 may be representative of a folder including further content files and/or folders therein. The display element 304, in such embodiments, may be associated with a second presentation specification. Thus, when the display element 304 is selected, the view presented will be achieved through instantiating a view of the second presentation specification.

FIG. 4 is a pseudo code listing 400 of a page description language document, according to an example embodiment. The page description language document, in this embodiment, is a package file and includes five content files packaged therein. The five packaged content files include a presentation specification in 2.0 OBJ, packaged content files 1, 2, and 3, and an image file in 6.0 OBJ that is referenced in the presentation specification, 2.0 OBJ. The pseudo code listing 400 includes a call to a presentation specification, 2.0 OBJ. In some embodiments, when a page description language document includes a presentation specification, the presentation specification is instantiated upon opening the page description language document.

A data structure of a presentation specification that may be included in a package file may include metadata associating each of one or more content files within a page description language document to a presentation display element of the presentation specification. However, in some embodiments, the metadata may define display elements to be instantiated by the presentation specification. A presentation display element may or may not be a hierarchical presentation display element. The data structure of the presentation specification may further include data defining a package file presentation header to be presented with a content file when selected within a page description language reader application for display, such as is illustrated in FIG. 2. In some embodiments, the presentation specification also includes instructions executable within an environment of the page description language reader application, or other application depending on the file type of the package file, to cause the presentation specification to be instantiated and displayed within a graphical user interface of the application. In some embodiments, the instructions may also be executable to modify an appearance of the displayed presentation specification in response to one or more events, such as a user clicking a mouse on a display element, a hover event of a mouse over a displayed element, or other event.

Figure 5:
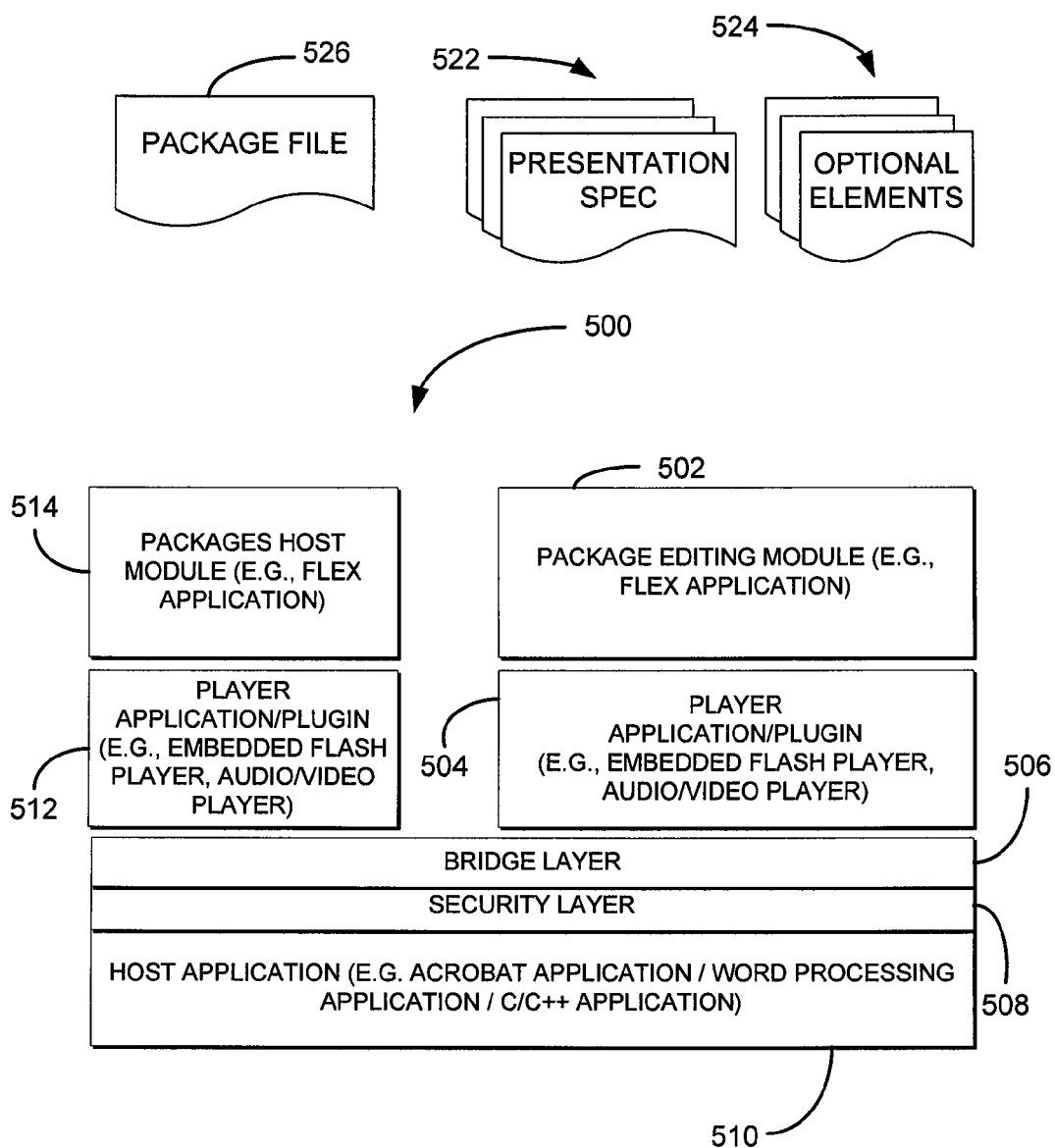
FIG. 5 is block diagram of logical portions of a system, according to an example embodiment.

FIG. 5 is block diagram of logical portions of a system, according to an example embodiment. FIG. 5 includes one or more presentation specifications 522 and optional elements 524 that may be selected and manipulated utilizing an application 500 to author a package file 526. The application 500, in some embodiments, is a page description language document authoring application that includes further modules that facilitate authoring of the package file 526. Such modules may include a package editing module 502, a first player application or plug-in instance 504, a package host module 514, and a second player application or plug-in instance 512. The first and second player applications or plug-in instances 504, 512 may be identical instances of an applications or plug-in, such as the FLASH® Player plug-in available from ADOBE SYSTEMS INCORPORATED of San Jose, Calif. However, in other embodiments, one or both of the first and second player application or plug-in instances 504, 512 may include one or more other media presentation applications or plug-ins capable of presenting media, such as images, animations, still and moving images, audio, and/or other media formats. Examples of such applications and plug-ins may include SilverLight available from Microsoft Corporation and QuickTime available from Apple, Inc.

The package editing module 502 and the package host module 514 are applications encoded according to a format of the respective player applications or plug-ins 504, 512 upon which they operate. In some embodiments, the package editing module 502 is operable within the player application/plug-in 504 to provide user interfaces that allow a package file 526 author to select one or more presentation specifications 522 and one or more optional elements 524 and to specify properties and enter other data into the package file 526. The package host module 514 is operable within the player application/plug-in 512 to display the package file 526 in a player mode and in an authoring mode. While in the player mode, the packages host module 514 is operable to allow a user to interact with a displayed package file 526 according to a presentation specification 522. While in the authoring mode, the packages host module 514 is operable to reflect changes made to the package file 526 by the package editing module 502.

Changes made to the package file 526 via the package editing module 502 are communicated to the package host module 514 via a bridge layer 506. The bridge layer 506 may be an interface in the form of a Application Programming Interface (API) that provides mechanisms by which data representative of data within the package file 526 and changes made to the package file 526 may be moved and may flow between the package host module 514 and the package editing module 502. For example, when the package editing module 502 is used to select one or more of the presentation specifications 522 for inclusion in the package file 526, data representative of a selected presentation specification is included in a bridge layer 506 function or method call which causes a reference to the selected presentation specification to flow to the package host module 514. However, in other embodiments, a data structure of the selected presentation specification may be passed via the bridge layer 506.

In some embodiments, due to the programmatic nature of the package editing module 502, package host module 514, presentation specifications 522, optional elements 524, and package file 526, the bridge layer 506 is insulated from a host layer 510 of the application 500. The host layer 510 may include a kernel or at least some portions of application 500. In some embodiments, the insulation of the bridge layer 506 from the host layer 510 is provided by a security layer 508. The security layer 508 may limit access to some resources of the application, such as access to files and other resources of and on a computing device upon which the application is present.

Figure 6:
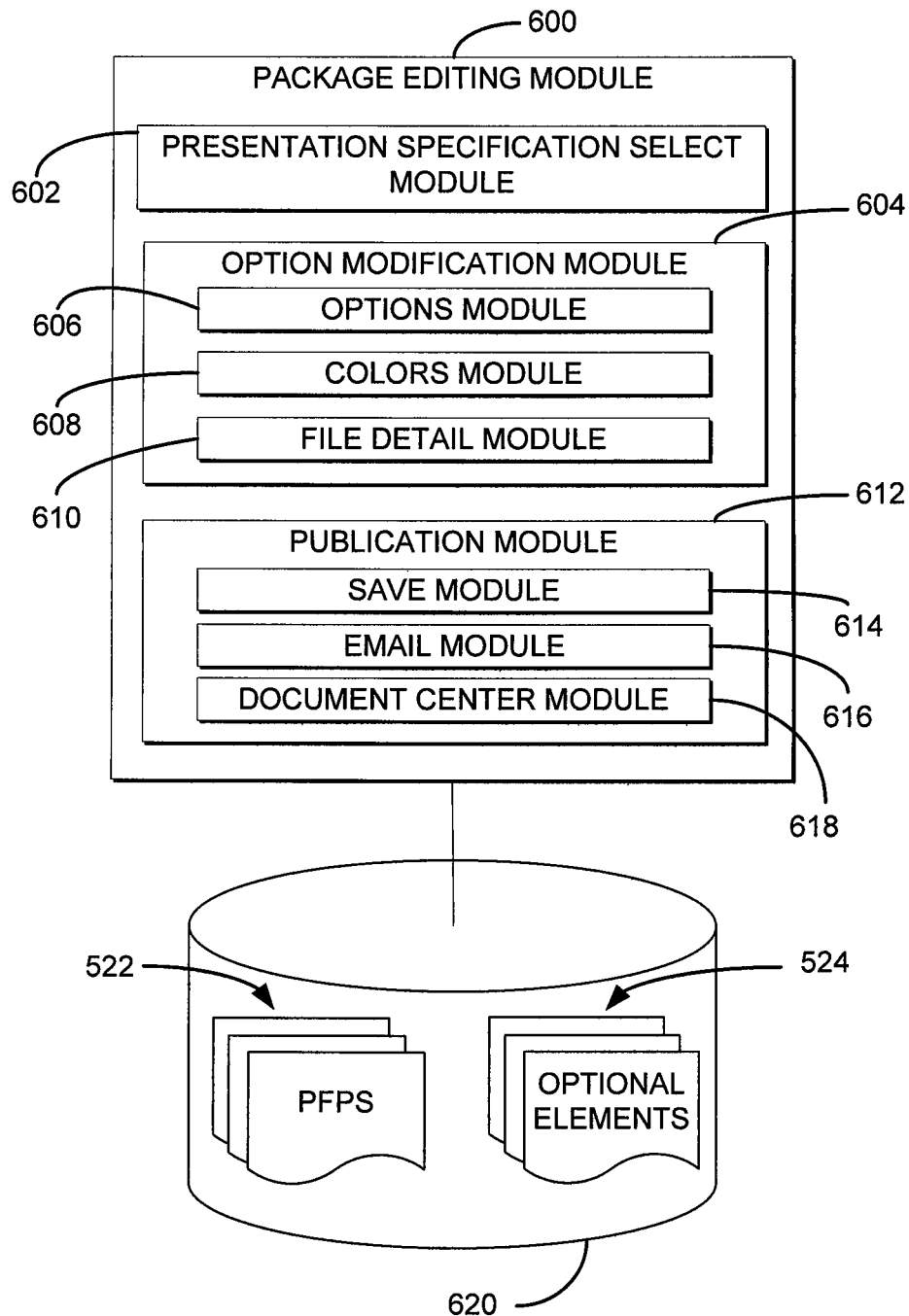
FIG. 6 is block diagram of logical portions of a system, according to an example embodiment.

FIG. 6 is block diagram of logical portions of a system, according to an example embodiment. The block diagram of FIG. 6 provides a detailed perspective of a package editing module 600. The package editing module 600 is one example embodiment of the package editing module 502 of FIG. 5. The package editing module 600 is but one example and may include a greater or lesser number of elements and other modules in other embodiments.

The package editing module 600, in some embodiments, includes a presentation specification select module 602, an option modification module 604, and a publication module 612. The presentation specification select module 602 is operative to provide a user interface to allow selection of a presentation specification 522 held in a storage device 620 to which the package editing module 600 has access. The presentation specification select module 602, upon receipt of a presentation specification selection, causes data representative of the selection to be communicated to a package host module, such as the package host module 514 of FIG. 5.

The option modification module 604, in some embodiments, is operative to present package file authoring options via one or more user interfaces according to one or more further modules. The further modules may include one or more of an options module 606, a colors module 608, a file detail module 610, and other modules depending on a selected presentation specification, the particular embodiment, permissions of a person using the package editing module 600, and other factors. In some embodiments, the options module 606 is operable to provide package file and presentation specification options to a user. Some such options may include security and encryption options, data compression options, options that modify how a presentation specification is displayed within a package host module, and other options that may apply to a package file as a whole or in part when displayed. Some further options may include one or more optional elements 524 from the storage device 620 which may be selected for inclusion in a package file or which may already be included or referenced in a selected presentation specification 522. Such optional elements 524 may include one or more navigation aids that provide navigation functionality within a displayed presentation specification. In some embodiments, the optional elements may include another instance of a media playing application or plug-in which may be configured to play an audio track, display a video, animation, a series of still images, or other media types when displayed. As with the presentation specifications 522, the functionality of the optional elements 524 is generally limited only by the imagination of an optional element developer or package file author.

The colors module 608, in some embodiments, provides one or more user interfaces operable to receive input to define colors used when displaying views of a package file within a presentation specification. The one or more user interfaces, in some embodiments, provide a color palette to select colors from or enter color specifications into, such as red-green-blue (RGB) values. In some embodiments, the colors module 608 is operative to receive a selection of one or more presentation specification elements via a menu item or by user input into the package host module 514, of FIG. 5, via the bridge layer 506, also of FIG. 5. The colors module 608 is the operative to receive color specification input for the selected elements and to populate the color specification input across the bridge layer 506 to cause the color specification input to be reflected in a view of the package file within the package host module 514.

In some embodiments, the file detail module 610 is operative to provide one or more user interfaces to allow users to define and manipulate metadata associated with a selected presentation specification and content files within a package file. Such user interfaces may allow a user to add, delete, and modify metadata fields and associate those metadata fields with content files within the package file or to the package file itself. The metadata fields may be designated for display or made invisible. In some embodiments, the metadata fields may be defined to hold descriptions of content files; to hold location (e.g., geospatial) data, such as latitude and longitude, of a location to which each content file is relevant; hold an X, Y coordinate pair mapping to an image location to which each content file is applicable; hold a date to which each content file pertains; and many other metadata types. In some embodiments, the metadata may provide additional functionality possibilities, such as automatic mapping of content files to locations within a reference image or animation, such as a map or calendar, as a function of the metadata.

In some embodiments, the file detail module 610 or other module may also include one or more user interfaces which may be used to view the contents of the storage device 620 or other local and/or remote storage devices. Such user interfaces may be used to view drive/folder/file type views of the storage devices and allow selection of one or more files to be included in the package file.

The publication module 612, in some embodiments, is operative to receive input specifying how to perform one or more functions with an authored package file. The one or more functions may include saving and/or distributing the package file. These functions may be accomplished through one or more, or a combination of, a save module 614, an email module 616, and a document center module 618.

The save module 614 is operative to present a user interface to save a package file to a storage device, such as the storage device 620. In some embodiments, the save module 614 leverages one or more functions of a host application, such as application 500 of FIG. 5, to store the package file. Such functions may include displaying a user interface providing a drive/folder/type view to receive input specifying where the package file is to be stored.

The email module 616, in some embodiments, is operative to call an email client present on a computing device upon which the package editing module 600 is operating to attach the package file to an email, which may then be addressed and sent using the email client. In some embodiments, an email client may be present within the email module or may be included within the application 500 of FIG. 5. In such embodiments, one or a series of user interfaces may be provided to receive one or more email address of intended recipients, a message, and the package file. The received input may then be sent via email utilizing a default email server or an email server identified in a configuration setting.

The document center module 618, in some embodiments, is operative to publish package files to a location where one or more users may access the document. The location may be a collaboration server. In some such embodiments, the document center module 618 is operative to instantiate a collaboration session on a collaboration server and embeds an identifier of the instantiated collaboration session within the package file. The package file may then be stored on the collaboration server. In some such embodiments, one or more user interfaces may also be provided to a user to select or enter one or more other users to then receive a notification of the instantiated collaboration session. In some other embodiments, after the collaboration session identifier is embedded within the package file, the package file may then be distributed via the email module 616 and/or stored using the save module 614. In these embodiments, when other users open the package file, the application within which the package file is viewed, such as a page description language reading application, may connect to the collaboration server and download comments and other data and display a representation of some or all of the downloaded data within the package file. The page description language reading application may also allow a viewer of the package file to enter comments or perform other actions, such as approving, and store data representative of the actions or of the comments to the collaboration server for other users or processes to see and use.

Figure 7:
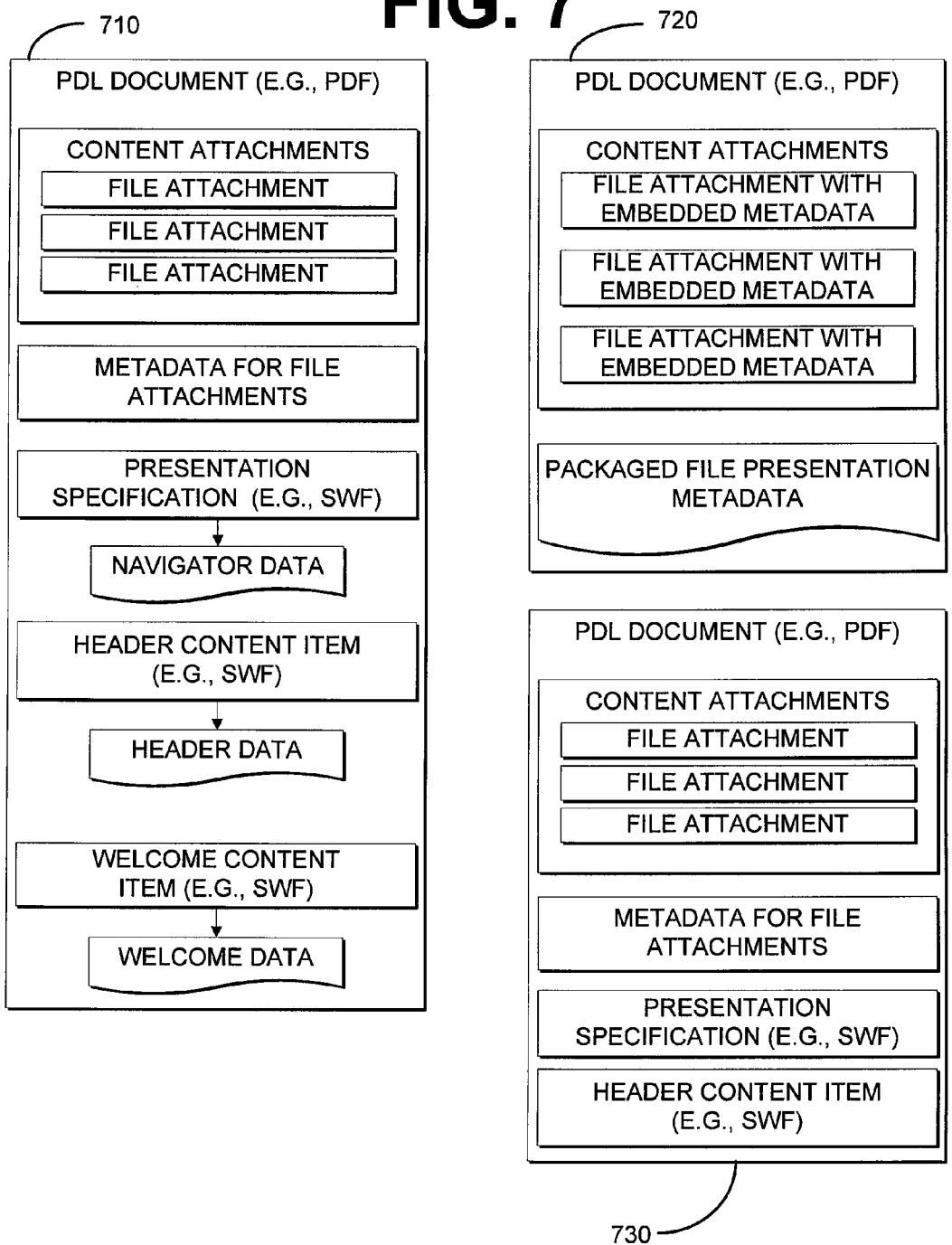
FIG. 7 includes block diagrams of various page description language documents, according to example embodiments.

FIG. 7 includes block diagrams of various page description language documents 710, 720, 730, according to example embodiments. While the example embodiment is described in the context of page description language documents, it will be appreciated that other embodiments may be implemented using types of documents and content. Each of the illustrated page description language documents 710, 720, 730 is slightly different from the others. The form of page description language documents, when taking the form of a package file, may vary from embodiment to embodiment based on the nature of the one or more presentation specifications utilized in presenting the package file. Further, in some embodiments, such as in the page description language document 720, the presentation specification is not even included in the page description language document 720, but instead is referenced in the package file presentation metadata:

A first page description language document 710 includes content attachments, such as one or more content file attachments and metadata for each of the one or more file attachments. The page description language document 710 further includes a presentation specification and navigator data for use by the presentation specification in presenting one or more views of the page description language document 710. The page description language document 710 further includes a header content item and header data defining how the header content item is to be displayed. The page description language document 710 also includes a welcome content item and welcome data defining how the welcome content item is to be displayed. A welcome content item is generally a first view of the page description language document 710 displayed when the page description language document 710 is first opened. A displayed welcome content item may be thought of as a "splash screen" in some embodiments.

A second page description language document 720 takes a different form from that of the first page description language document 710. The second page description language document 720 includes one or more file attachments and each file attachment includes embedded metadata. The page description language document 720 further includes package file presentation metadata, which includes a reference to at least a presentation specification and metadata of how the presentation specification is to be instantiated and presented. When the page description language document 720 is opened, a suitable application for presenting a view of the page description language document 720 may identify that there is a reference to a presentation specification and obtain a copy thereof from a referenced location, such as an Internet or other network location, by download. The application for presenting the view of the page description language document 720 may then extract the metadata embedded in each of the file attachments. The presentation specification is then instantiated as a function of the package file presentation metadata and the extracted file attachment metadata.

A third page description language document 730 takes yet another form. The page description language document 730 includes one or more file attachments and metadata for each file attachment. The page description language document 730 also includes a presentation specification and a header content item. The presentation specification will be instantiated as a function of the file attachment metadata. The header content item, in such embodiments, includes enough information so as not to require further data to instruct it how to instantiate.

Each of the page description language documents 710, 720, 730 includes a different form as described and illustrated. This is not intended to be a listing of all forms that page description language documents that are package files may take. Instead, the embodiments in FIG. 7 are examples as to the flexible nature of package files.

Figure 8:
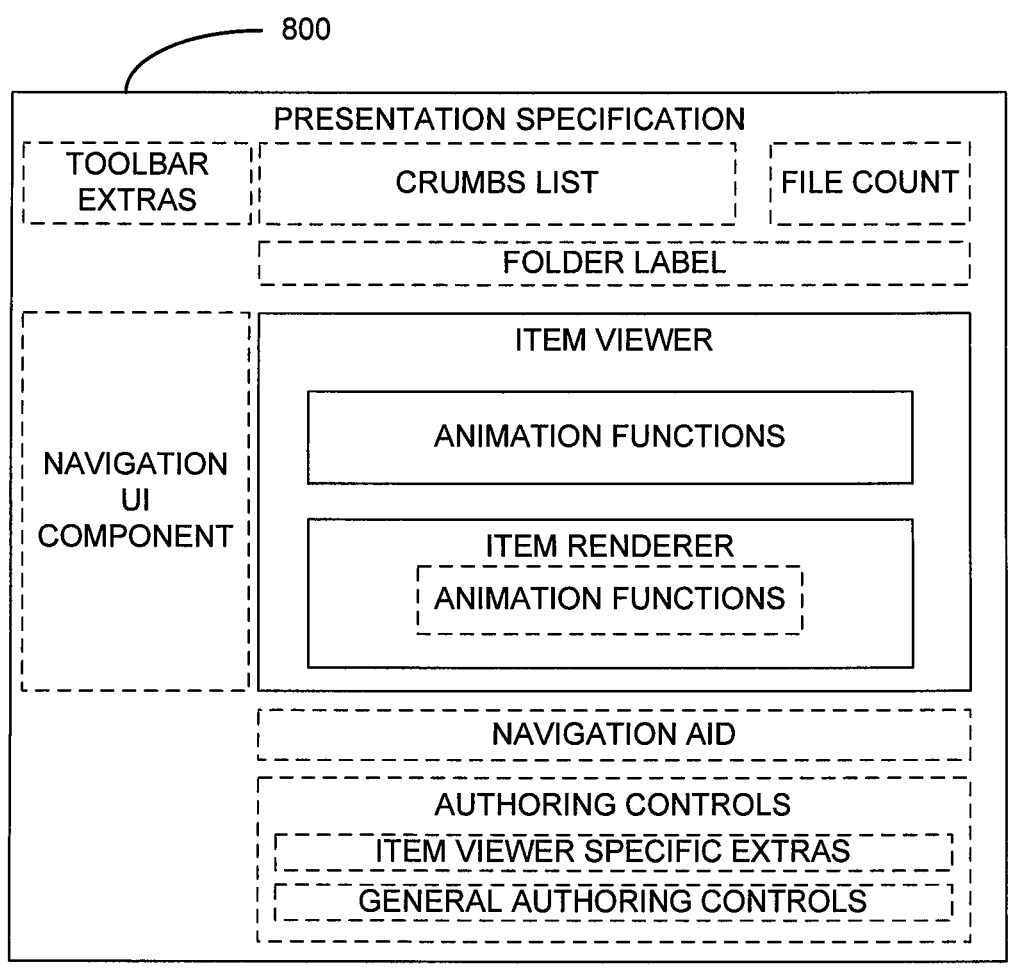
FIG. 8 is a logical block diagram of a presentation specification, according to an example embodiment.

FIG. 8 is a logical block diagram of a presentation specification 800, according to an example embodiment. The presentation specification 800 may include various elements, including an item viewer that is operative to instantiate one or more instances of an item renderer. An item renderer, when instantiated, is operable to render a view of an item, such as a content file or folder included in a package file. Such item renderer views are typically generated as a function of metadata included in or otherwise referenced by a package file to be display. An item renderer may include one or more display states that may change upon occurrence of an event, such as a mouse hover or receive focus event. An item renderer may also include one or more animation functions that animate a view of an item between states display. The item viewer is also operable to receive input to modify which item renderers are displayed or to modify which content files are represented by the instantiated item renderers. The item viewer, in some embodiments, includes one or more animation functions to animate transitions between the displayed item renderers or the content files represented by the instantiated item renderers.

The presentation specification 800, and elements therein, may be defined or configured in metadata. In some such embodiments, the presentation specification 800 may include executable code that implements functionality of the particular presentation specification. In some embodiments, the code is in a runtime scripting language, such as Java Script, Visual Basic (VB) Script, Action Script, and the like. Such code allows authors to add scripting and code to presentation specifications to implement functionality of various elements. Such code may be executable within an application or application plug-in, such as the FLASH® Player application plug-in, discussed above, or other applications or application plug-ins. In other embodiments, the code is compiled code writing in a language, such as C/C++, capable of implementing the desired functionality, which may be accessed and executed within or caused to be executed by an application within which a package file is to be viewed.

In some embodiments, the item view animation functions include at least two animation functions. A first animation function is called when user input is received to navigate through item renderer views in a slow fashion, such as between two adjacent item renderers. A second animation function may be called when user input is received to navigate through item renderers in a fast manner, such as from a first item renderer to a last item renderer, or such as when there are large number of item renderers or content files represented by the item renderers.

The presentation specification 800 may also include a "crumbs list" element that display is a crumbs list within an interface. A crumbs list is a representation of a relative location within a package file. For example, a package file may include a first level of content item organization including a file and two file folders. One of the file folders may include a few more files. When viewing the package file content files, initially the crumbs list may include text "HOME." A user may then select one of the two file folders to cause the files of the selected file folder to display, thereby causing the crumbs list to display "HOME/FOLDER A" where "FOLDER A" is the selected folder.

The presentation specification 800 may also include a file count element that displays a count of a number of files included in a selected view within the item viewer. This count may be a simple count of the number of files. However, in some embodiments, the count may identify which files of a count of files are currently displayed within the item viewer. For example, the file count element may provide, "FILES 4-7 of 14."

In some embodiments, the presentation specification 800 may include a folder label element. A folder label element provides the name of the folder currently being viewed within the item viewer. As with the crumbs list described above, in an initial view, the folder label element may provide "HOME." When folder A is selected for view, the folder label element will then provide "FOLDER A."

The presentation specification 800 may also include one or more navigation aids. A navigation aid is an element that provides mechanisms that represent files within a package file that may be selected to navigate to the represented files. Some such representations may include one or more of folders, groups of files, file types, and other logical units that may be provided based on the specific navigation aid included in the presentation specification 800 and the requirements of the specific embodiment. For example, one navigation aid may provide icons representative of image files, audio files, word processing document files, and "other files." Selection of the image files icon will cause the item viewer to change the view it presents, including the instantiated item renderers, to a view that includes only image files included within the viewed package file. Another navigation aid may provide a folder view, including icons and labels of folders, included within a displayed package file that may be selected to navigate to the respective folders. Yet another navigation aid may present a representation of all files included within a displayed package file, or displayed folder therein. The package file may include fifteen files and the navigation aid may include an icon for each of the fifteen files. Selection of one or more of the icons in such an embodiment will cause the item viewer to navigate to a view including the file represented by the selected icon. In some such embodiments, the icons representative of the files that are currently displayed are modified to indicate that the files represented by the modified icons are currently displayed within the item viewer. Such modification may include an outlining of the icon, display of an alternate icon, backlighting an icon, animating an icon, or other modification that will graphically convey the fact that the file represented by an icon is currently displayed within the item viewer.

Some embodiments may also include one or more navigation user interface components, such as a tree-view type component. In such embodiments, the navigation user interface component may provide a tree-view of a folder/file structure of a package file. In some embodiments, the files and folder of a package file may be an export from an email client and include emails arranged in folders, such as inbox, sent items, deleted items, and the like. In such embodiments, the tree-view provides a folder representation of each folder that may be expanded and collapsed to view and hide subfolders. Selection of a tree-view item in such embodiments causes the item viewer to display the contents of the folder represented by the selected item.

In yet further embodiments, the presentation specification 800 may also include toolbar extras. Toolbar extras may cause a toolbar button to be displayed within a user interface of an application displaying a representation of a package file as a function of the presentation specification 800. A toolbar extra, in one embodiment, may be a toolbar button that triggers a process encoded within the presentation specification 800 to import email from an email client or allows a user to select files for inclusion in the package file. A toolbar extra in other embodiments may include a "SEARCH" button that provides mechanism by which a package file, and/or content files therein, may be searched. In some such embodiments, various search options may be provided such as a global package file text search, package file type specific searches, searches based on types of data included in a package file or content files therein, such as CAD related data, geospatial metadata, dates, and other data types. Other toolbar extras may trigger one or more other processes and may utilize code embedded within the presentation specification 800 and or the application displaying the representation of a package file.

The presentation specification 800 also includes authoring controls which may be used when authoring a package file with regard to a presentation specification. The presentation specification 800 includes two modes of display. The first mode is an authoring mode which is optionally viewable within an application providing package file authoring functionality and allows modification of the package file and configuration of the presentation specification 800. The second mode is a viewing mode and only allows a user to view and navigate through content within a package file.

The authoring controls may include item viewer specific extras, general authoring controls, and other controls based on the specific presentation specification selected. The authoring controls may provide functional user interface elements that allow a user to add files, or references thereto, to a package file. The authoring specific extras may allow a user to configure item viewer or item renderer controls, such as selecting optional animation functions, display sizes, metadata to display within an item renderer, and other display options. The general authoring controls may include options such as which navigation aids to use or display, the setting of icons used in displaying various elements of the navigation aids, the navigation user interface component, and inclusion and/or configuration of the crumbs list, folder label, file count, and toolbar extras. Other authoring controls may be provided based on the elements included within a particular presentation specification 800 that may be selected.

FIG. 9 is a user interface 900 illustration generated as a function of a presentation specification, according to an example embodiment. The user interface 900 includes a header 902, a crumbs list element 904, a file count element 906, and a folder label element 908. The user interface 900 further includes a card listing 910 of content files packaged in a package file the user interface 900 represents.

The header 902 is configured in metadata and may include various textual elements, graphics, audio tracks, animations, and other media types. In the present embodiment the header 902 includes only text.

The crumbs list element 904, file count element 906, and folder label element 908 illustrate examples of these elements as described with regard to FIG. 8. Note, though, that the card listing 910 is a listing of cards identified by the "FOLDER NAME" in both the crumbs list element 904 and folder label element 908. Further, the file count element 906 is a count (27) of the files in the "FOLDER NAME" folder and identifies which files (21-27) are displayed.

The cards displayed in the card listing 910 each include a thumbnail image (shown as a black box) and a description of the file each respective card represents. Selection of a card, such as by double-clicking with a pointing device, will cause the file represented by the card to be displayed, such as in the user interface 200 of FIG. 2. In some embodiments, a card may represent a folder including further files. In such instances, selection of a card that represents a folder will cause the crumbs list element 904, the file count element 906, and the folder label element 908 to be modified to display appropriate data based on the selected folder and the card listing 910 will then display card representative of the files therein. However, in some embodiments, a folder may be configured with a difference presentation specification and the contents of the folder will be displayed in accordance with that presentation specification.

The card listing 910 is illustrated in an authoring mode. When in the authoring mode, the card listing will include a card 912 that allows an author to add a file and add an image to the card of the file. To add a file, the author selects the card, such as through use of a pointing device or other input device. The author is then presented with one or more user interfaces that may be used to select a file to be packaged in the package file or to attach an image to a card. In some embodiments, the card 912 may also allow an author to create a folder. In such instances, the author may be allowed to not only create a new folder, but also to associate a presentation specification with the new folder.

The card listing 910, when in the authoring mode, may also allow a user to drag and drop files and folders from outside of the user interface 900 into the card listing 910. Folders and files may also be moved around within the card listing in some embodiments. This may include selecting one or more cards and dragging and dropping the selected cards into a displayed folder. The package files represented by the selected cards and the cards themselves are then reorganized to be included in the folder to which the cards were moved. The code to facilitate the authoring mode of the presentation specification may be included in part in the presentation specification, to accommodate for specific authoring options and functionality of the presentation specification, and within an application within which the package file is being authored, such as a page description language authoring application. Such authoring functionality is generally available in each of the presentation specifications described and illustrated herein.

In a display or non-authoring mode, the "add file" card 912 is not displayed and the files and folders within the package file may not be reorganized.

FIG. 10 is a user interface 1000 illustration generated as a function of a presentation specification, according to an example embodiment. The user interface 1000 also includes a header 1002, a crumbs list element 1004, a file count element 1006, and a folder label element. The header 1002 illustrates another example of how a header may be configured. The header 1002 includes an image and text. As noted above, the image may be animated, such as by including a FLASH® enabled SWF type animation within the header or an animated GIF image.

The user interface 1000 includes a horizontal card listing 1008 that may be navigated through by using navigation arrows 1010 and 1012. Each card of the horizontal card listing 1008 is representative of a file or folder packaged in a package file. Each card may be configured to include various elements that convey what content is included in the file or folder the card represents. The various elements may include text, images, animation, audio, and other media types. These elements may be customized in some embodiments through definition of metadata types and entry of the metadata.

In some embodiments, the cards of the horizontal card listing 1008 are instances of an item renderer instantiated by an item viewer. The item renderer and item viewer are included in the presentation specification as described and illustrated with regard to FIG. 8. In some instances, the item viewer includes code or a configuration setting specifying a number of cards to display and then instantiates an item renderer for each of the number cards to display. In such instances, the item viewer then instantiates the number of item rendered and populates each instantiated item renderer with metadata of the file to be displayed. For example, if the number of cards to display is three, the item viewer will instantiate three instances of the item renderer in appropriate locations within the horizontal card listing 1008. The item viewer will then populate the instantiated item renderers with data to be displayed. That data, when first presenting a view of the package file, may be the data of the first three files in the package file.

Next, when a user navigates through the horizontal card listing 1008 using the arrows 1010 and 1012, the item viewer tracks a displayed position within the package files and moves the package file through the instantiated item viewers. Thus, three item viewers will be displayed and recycled by moving data sequentially through the item viewers as a user traverses the package files. In some embodiments, though, a user may wish to jump from files 1-3 to files 10-12. In such instances, the item viewer may skip displaying and moving the data of files 4-9 and jump directly to the data of files 10-12.

When navigating through the horizontal card listing 1008, the item viewer may animate transitions from one set of displayed cards to another. For example, the animation may cause the cards of the horizontal card listing 1008 to appear as if they are moving horizontally. If a user jumps, such as the jump from files 1-3 to files 10-12, a second navigation may blur the horizontal card listing 1008 to simulate the displayed cards moving rapidly. Other animations are possible and may be presentation specification specific. However, in some embodiments, animations may be reused between presentation specifications. In such instances, the code and/or media to cause such animations may be included as function calls in the application within which the package files may be authored and/or viewed.

In further embodiments, other elements of presentation specifications may also be included in the application within which the package files may be authored and/or viewed. For example, item viewer and item renderer abstractions and extensions may be included in the application and called by code or referenced by metadata included within a presentation specification.

Figure 11:
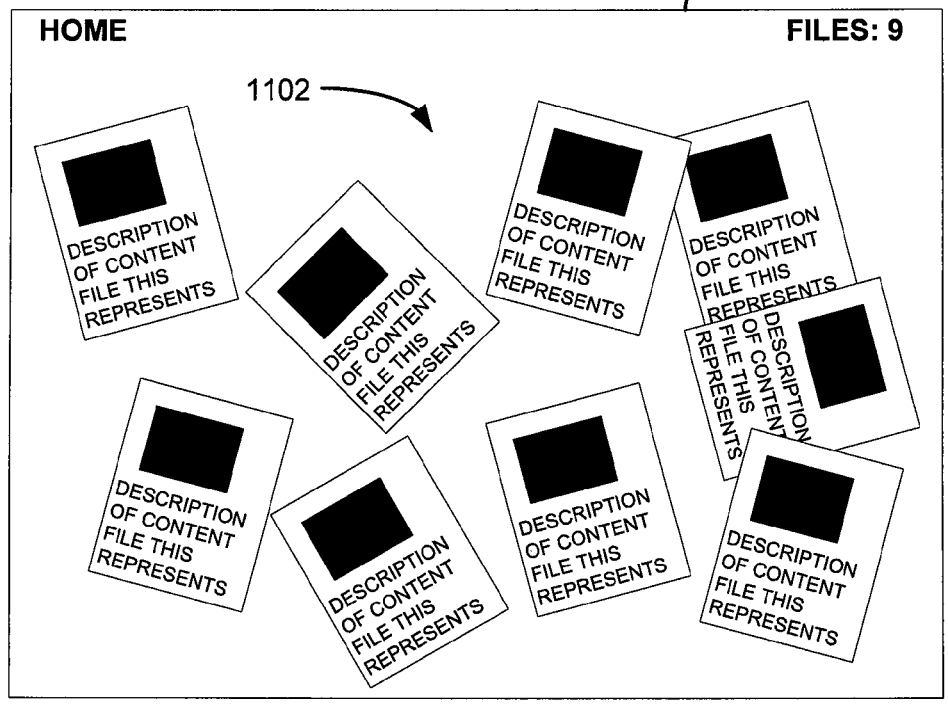
FIG. 11 is a user interface illustration generated as a function of a presentation specification, according to an example embodiment.

FIG. 11 is a user interface 1100 illustration generated as a function of a presentation specification, according to an example embodiment. The presentation specification includes a card presentation 1102. Each card of the card presentation 1102 represents a file or folder included within at least a portion of the package file, or a metadata reference to a file or folder located elsewhere that may be viewed within the user interface 1100 of the presentation specification.

The card presentation 1102 includes cards as described above. However, in some embodiments, the cards may be images derived from an image file or other file a respective card represents. The cards of the card presentation 1102 are randomly scattered across the card presentation 1102 portion of the user interface 1100. In some embodiments, the random (or a semi-random) distribution is made according to a set of rules or parameters which may be hard coded within a presentation specification or provided as display options within the presentation specification authoring controls as illustrated and described with regard to FIG. 8. For example, such rules or parameters may specify a size of the card presentation 1102 area of the user interface 1100, a size for each card, one or more formulas for calculating a rotation orientation of each card, a tilt perspective, an opacity of each card, whether or not the cards may overlap one another when displayed, and other rules or parameters that may affect how the cards are displayed. When a user selects a card within the card presentation 1102, the card may be zoomed-in on, such as is illustrated in FIG. 12.

Figure 12:
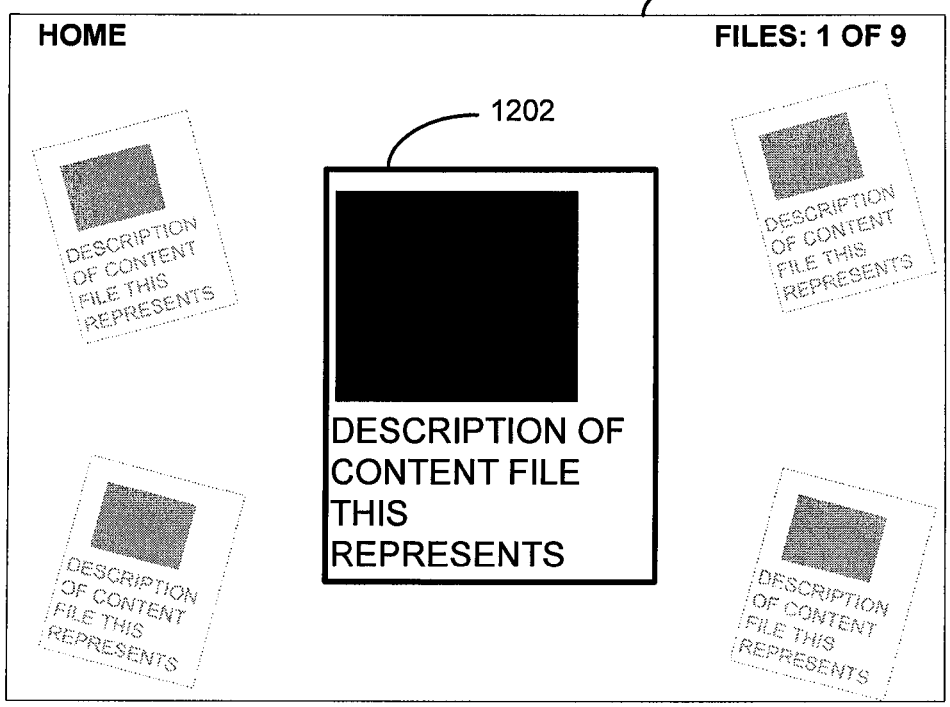
FIG. 12 is a user interface illustration generated as a function of a presentation specification, according to an example embodiment.

FIG. 12 is a user interface 1200 illustration generated as a function of a presentation specification according to an example embodiment. The presentation specification of the user interface 1200 may be the same presentation specification of the user interface 1100 of FIG. 11. The user interface 1200 provides the zoomed-in view of the card selected within the card presentation 1102 of FIG. 11. The user interface 1200 includes the selected card 1202 and provides a larger zoomed-in view of it. An animated transition between the card presentation 1102 and the zoomed-in view of the card 1202 may be provided by the presentation specification to show the card 1202 getting larger and portions of the card presentation 1102 going out of view. Within the user interface 1200, other cards of the card presentation 1102 may still be in view, but be smaller in relation to the larger card 1202. The smaller cards may have greater opacity causing them to appear faint within a display. The card 1202 may then be selected to cause a view of the file represented by the card to be displayed, such as in the user interface 200 of FIG. 2 or within another application suited for displaying the file, such as an image editing application if the file is an image or a word processing application if the file is a word processing application. In some embodiments, selecting the file may cause the file to be transmitted over a network, such as the Internet, to a network hosted application to allow viewing and/or editing of the file in the network hosted application. In some such embodiments, if the file is modified and resaved, the file may be stored back to the package file over the network.

If a user no longer wishes to view the zoomed card 1202, the user may use a pointing device or other input device to signify that intent by selecting an area outside of the card 1202 and the card presentation 1102 of the user interface 1100 will return.

FIG. 13 is a user interface 1300 illustration generated as a function of a presentation specification, according to an example embodiment. The user interface 1300 includes a crumbs list element 1312 and a file count element 1314, both as described and illustrated with regard to FIG. 8. The user interface further includes a view of grouped files 1306, 1308, 1310. Each group of files 1306, 1308, 1310 also includes a label, such as label 1316 "MANUALS" for group 1310. The groups 1306, 1308, 1310 are individually displayed within an item renderer under control of an item viewer as discussed above. The groups 1306, 1308, 1310 may be traversed using navigation arrows 1302, 1304.

The groups 1306, 1308, 1310 are each represented by a stack of cards. Each card may be representative of a file within a folder of the respective group. Each card may include an image or animation, a description, and/or other data. The cards typically over lap each other except a top card which is fully viewable.

FIG. 14 is a user interface 1400 illustration generated as a function of a presentation specification, according to an example embodiment. The user interface is another view presented by the same presentation specification as in FIG. 13. The user interface 1400 includes a pointer 1402 under control of an input device of a computing device, such as the mouse of a PC. The pointer is hovering over the "MANU- ALS" group 1310. The hover event causes the group 1310 to move the cards of the group 1310 to allow a larger portion of the stacked cards to be displayed. In some embodiments, a description bubble 1404 may also appear upon the hover event. In some embodiments, rather than a hover event, a single click event with the pointing device may cause the expanded view of the cards and the description bubble 1404 to appear. Selection of a group, such as the "MANUALS" group 1310, causes another user interface to be displayed, such as a user interface of another presentation specification. This user interface may be generated as a function of any of the other presentation specifications described and illustrated herein. One user interface generated as a function of another presentation specification is illustrated in FIG. 15.

FIG. 15 is a user interface 1500 illustration generated as a function of a presentation specification, according to an example embodiment. The user interface 1500 includes a crumbs list element 1502, file count element 1504, and a folder label element 1506 as described and illustrated above, including with regard to FIG. 8. The user interface 1500 also includes a horizontal card listing of card 1512, 1514, and 1516 as illustrated and described above with regard to the horizontal card listing 1008 of FIG. 10. The cards 1512, 1514, and 1516 may be traversed using navigation arrows 1508, 1510. The cards 1512, 1514, 1516 of the horizontal card listing in FIG. 15 are cards of the "MANUALS" group 1310 as selected in the user interface 1400 of FIG. 14. In some embodiments, the user interface 1500 of FIG. 15 may also include another element that displays the text displayed within the description bubble 1404 of FIG. 14.

In some embodiments, the user interface 1500 may also include a navigation aid 1518. The navigation aid 1518 provides a groups view similar to that of FIG. 13 and FIG. 14. The groups may include hover or selection events as described above with regard to FIG. 14 and may be navigated through using the provided navigation arrows. Selection of a group in the navigation aid 1518 causes the user interface 1500 to navigate to the selected group and display the cards in the horizontal card listing of the group selected in the navigation aid.

Selection of a card in the horizontal card listing, such as card 1512, may cause another user interface to be displayed as a function of virtually any other presentation specification illustrated and described herein. For example, selection of the card 1512 may cause the user interface of FIG. 16 to be displayed.

Figure 16:
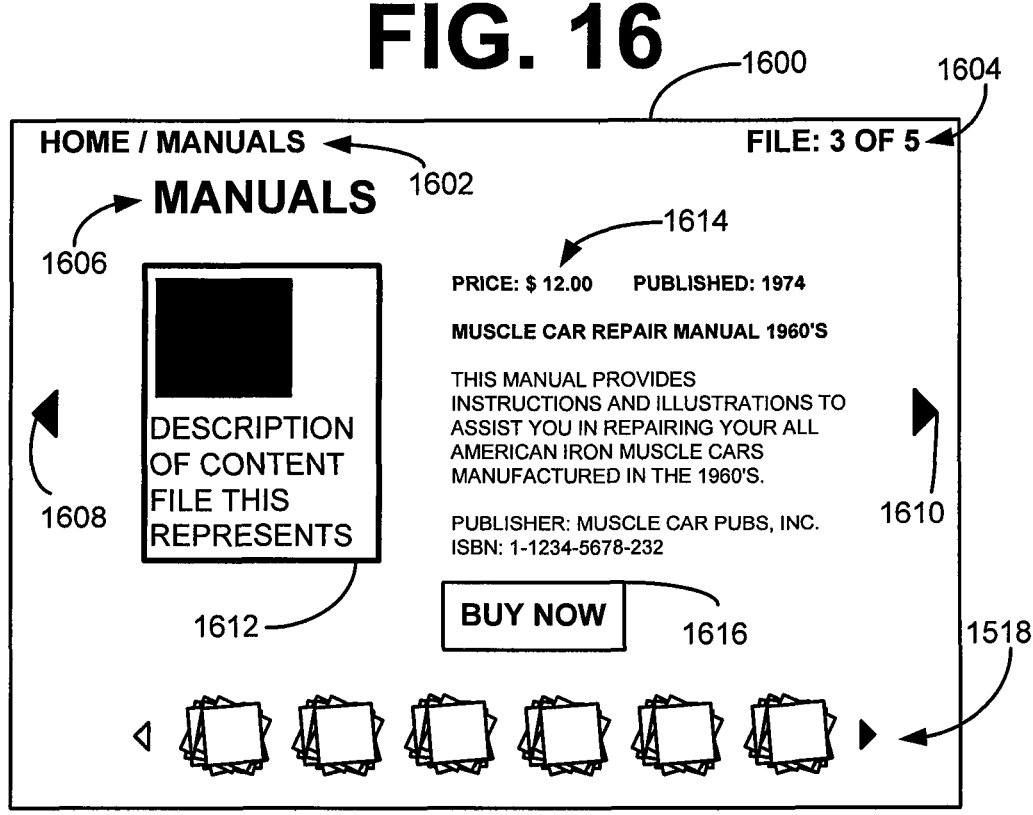
FIG. 16 is a user interface illustration generated as a function of a presentation specification, according to an example embodiment.

FIG. 16 is a user interface illustration 1600 generated as a function of a presentation specification, according to an example embodiment. The user interface 1600 includes a crumbs list element 1602, file count element 1604, and a folder label element 1606 as described and illustrated above, including with regard to FIG. 8. The user interface 1600 also includes navigation arrows 1608, 1610 to navigate to adjacent files within a package file. In the user interface 1600, a selected card 1612, such as the card 1512 of FIG. 15, is displayed. The card 1612 may be a card as described elsewhere herein and may include one or more of text, images, animations, and other media types. The user interface 1600 also includes a detail area 1614 where details of the file or other item represented by the card are displayed. These details may be included in the metadata of the package file and associated with the selected card 1612. In some embodiments, the user interface 1600 may also include one or more action elements, such as toolbar extras as described above with regard to FIG. 8 or an action button 1616. Selection of the action button 1616 may cause a data processing activity to be triggered. For example, the user interface 1600 includes data representative of an item available for purchase. Selecting the action button, such as through a mouse click or other received input, triggers a process which allows a user to purchase the item. This action may include launching a web browser to open a specific universal resource locator (URL) or may launch an interface to allow a user to enter purchasing information, such as credit card numbers, shipping addresses, and the like.

In some embodiments, the item represented in the user interface 1600 is a content item embedded within the package file being viewed. However, the content item may be secured and not available for viewing, playing, or other mode of consumption unless the item is purchased. In such embodiments, a user may select the "BUY NOW" action button, provide the requested purchase information through a user interface of the package file, such as a user interface generated as a function of another presentation specification or through a web site, and then be allowed to consume the content item represented within the user interface 1600.

Thus, the series of user interfaces 1300, 1400, 1500, and 1600 of FIG. 13, FIG. 14, FIG. 15, and FIG. 16 may be configured within one or a group of package files to distribute and present an interactive catalog of products. Some such products may also be included in the one or more package files. Such products included with the package files may include textual documents, such as digital books, word processing document templates, and premium textual content. Premium textual content may include proprietary mailing and contact lists, and audio recordings, such as audio books, music, and mobile telephone ringtones. The products may also include video, such as movies and television shows, and other content, which may be included in a secure manner in an electronic file. In some embodiments, the package files may be viewed and purchases may be made using a PC, a mobile computing device such as a laptop, smart-phone, or handheld computer, and other computing devices such as a set-top box coupled to a television, display monitor, or other audio/visual device.

Figure 17:
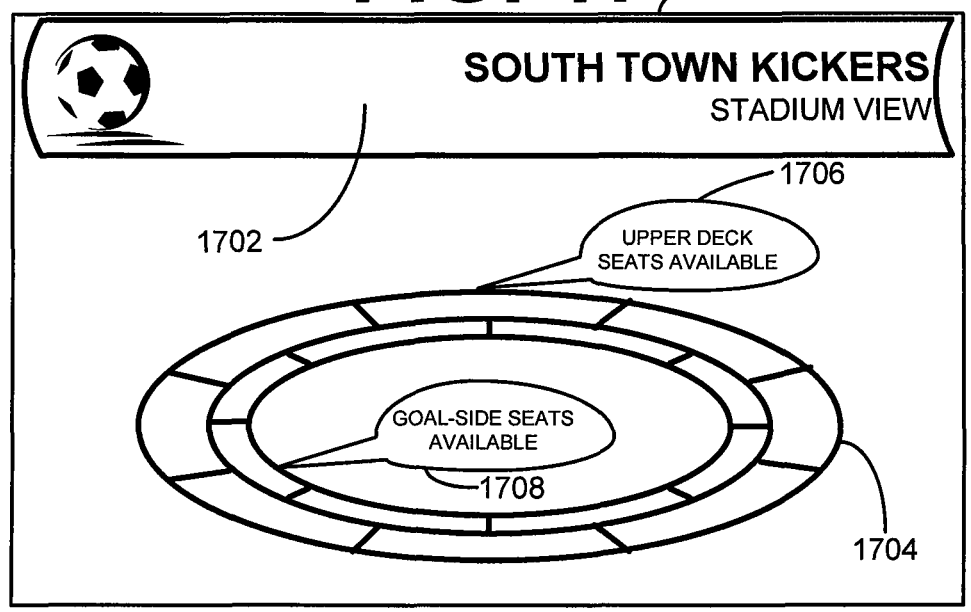
FIG. 17 is a user interface illustration generated as a function of a presentation specification, according to an example embodiment.

FIG. 17 is a user interface 1700 illustration generated as a function of a presentation specification, according to an example embodiment. The user interface 1700 includes a header 1702 and a reference image 1704. Displayed with reference to the image 1704 are markers 1706 and 1708. The markers are defined in the metadata. The metadata includes a mapping to a location within the image 1704 in which the markers are to be placed when the image is displayed. In the illustrated example, the image 1704 is an image of a soccer stadium where tickets are available in the sections identified by the markers 1706, 1708. In other embodiments, the image may be virtually any image, such as an image of an automobile and including markers identifying items selected for marketing, such as a marker of a wheel of an automobile image to identify high performance tires and braking systems of the automobile. The markers may also include textual descriptions, which are displayed or are displayed upon an event such as a pointer hovering over the marker. In some embodiments, an event such as a hover event or selection event of a marker may cause a portion of the image 1704 to become animated, such as a wheel on the automobile rotating, or for audio to play, such as a sound of a soccer crowd cheering upon a hover event with regard to one of the markers 1706, 1708.

Selection of one of the markers 1706, 1708 may also cause another user interface to launch, such as one of the other user interfaces described herein, that is generated as a function of the presentation specification. In some embodiments, selection of one of the markers 1706, 1708 may cause a web browser to be launched to display a webpage providing further information or allowing a user to make a purchase that is related to the selected marker, such as purchasing tickets to a soccer game or requesting further information with regard to a displayed automobile. In some embodiments, selection of a marker 1706, 1708 may trigger launching of an application, such as a FLASH® based application, that allows a user to make a purchase without departing from the application within which the user is viewing the package file.

In further embodiments, selection of a marker 1706, 1708 may cause another, more detailed image to replace the displayed image 1704. For example, if the user selects marker 1706 "UPPER DECK SEATS AVAILABLE," the stadium image 1704 is replaced with an image of a seating chart of an upper deck seating section of the stadium. This provides a hierarchical option for linking files within a package file similar to that illustrated and described with regard to FIG. 3.

The markers may be placed on the image in an authoring mode by selecting a menu item to add a marker or selecting a file from a listing of files and then placing moving the marker around in a drag-and-drop fashion. In other embodiments, the image may include metadata defining areas of the image. Files embedded within a package file may include metadata referencing one or more locations defined within the image metadata. In such embodiments, an item viewer of a presentation specification, or other code element in the presentation specification or application for displaying a package file, may place the markers on the image as a function of the image metadata and the file metadata.

Figure 18:
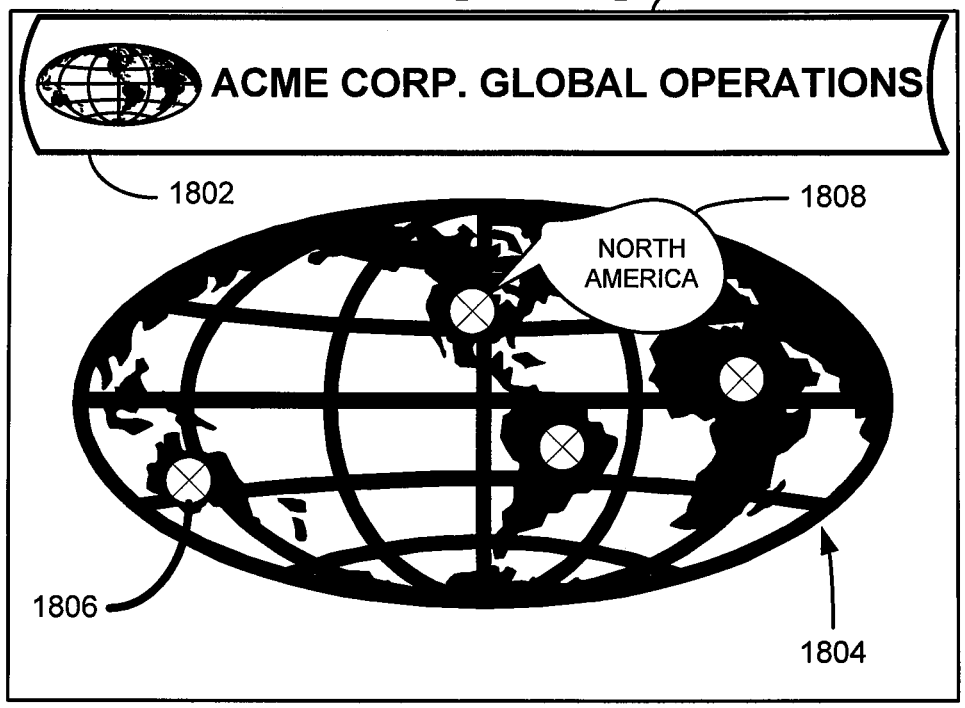
FIG. 18 is a user interface illustration generated as a function of a presentation specification, according to an example embodiment.

FIG. 18 is a user interface 1800 illustration generated as a function of a presentation specification, according to an example embodiment. The user interface 1800 includes a header 1802 as described elsewhere herein. The user interface 1800 also includes an animation 1804. The animation 1804, in some embodiments, may be navigated by moving a pointer around within the user interface and with regard to the animation 1804. In the illustrated example, the animation is a globe. Moving the pointer toward the right and left edges causes the animation 1804 to cause the globe to appear as if it is rotating on northern and southern poles.

User interface 1800 also includes markers 1806 mapped to locations within the animation. For example, the illustrated globe animation may include geospatial data defining a latitude and longitude with regard to the animation. The markers 1806 may be mapped using metadata defining a latitude and longitude where each respective marker is to be located. In other embodiments, regions may be defined with animation 1804 metadata and marker locations identified with regard to the defined regions. Such regions may be defined with regard to data represented within the animation, such as North America.

When authoring a package file using an animation such as is illustrated in FIG. 18, an authoring user interface may be provided that allows an author to select an animation, or other image, and define reference areas within the animation. For example, a simple X, Y coordinate structure could be assigned. In other embodiments, an interface allowing a user to define regions may be provided. In some embodiments though, an animation or other image may be provided in a presentation specification that already includes addressable metadata, such as latitude and longitude with regard to a globe or map. In such instances, in an authoring mode, a user may be presented with a latitude and longitude entry user interface to enter coordinates as to where a marker is to be placed.

In further embodiments, markers may automatically be placed within an animation, or other image, for a content file added to a package file. In such embodiments, the file may include metadata defining a location where a marker representative of the file is to be placed. That metadata may define a latitude and longitude coordinate set as described above. The metadata may alternatively identify another location as defined within the metadata of the animation or other image.

In some embodiments, each marker may also include descriptive text, an animation, an audio file, or data that may presented upon an event occurrence with regard to a respective marker. For example, a marker is located within the animation 1804 at a location with regard to North America and a description bubble 1808 pops up upon a mouse-over event. In another embodiment, an audio file could be triggered upon the mouse-over event.

In some embodiments, selection of a marker or other location within the animation 1804 may cause another user interface to display. In some embodiments, the other user interface may be related to the area selected within the animation 1804 or other image. For example, if the animation 1804 were a computer-aided drafting (CAD) image or animation, an area selected may be a part that is further described in a more detailed CAD file that is identified in the metadata of the one or more CAD files. In such an instance, the detailed view of the selected CAD image or animation may be displayed in the user interface 1800 or other user interface. In another example embodiment, an area of the globe animation 1804 illustrated in FIG. 18 may be selected. The selected area may be represented in a zoomed-in map included in the package file being presented as identified in metadata of the package file or of one or more of the package files. In such an instance, the zoomed-in map may be presented, such as in the user interface of FIG. 19.

Figure 19:
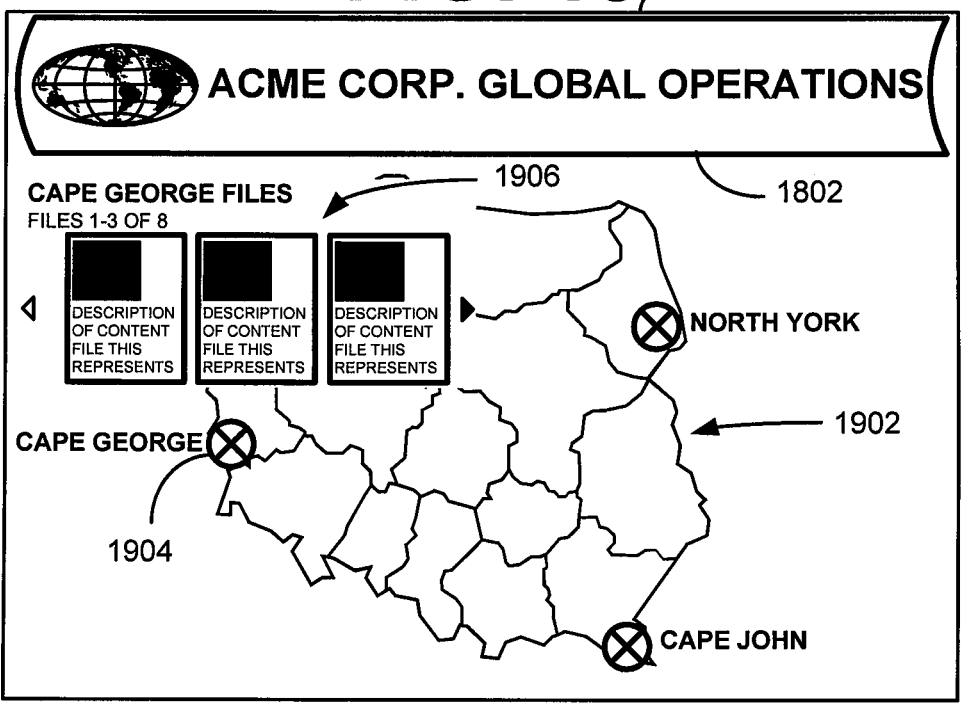
FIG. 19 is a user interface illustration generated as a function of a presentation specification, according to an example embodiment.

FIG. 19 is a user interface illustration 1900 generated as a function of a presentation specification, according to an example embodiment. The user interface 1900 includes the zoomed-in view of the selected area of the animation 1804 of FIG. 18 described above. The user interface includes an image 1902, which in this instance is a map, but could be a CAD or other image in other embodiments. The image may be an animation in some embodiments. The user interface 1900 includes further markers mapped to locations within the image as discussed above with regard to FIG. 17 and FIG. 18. Selection of a marker, such as marker 1904 "CAPE GEORGE" may cause a representation of one or more files represented by the marker to be displayed. This representation may be made in another user interface generated as a function of one or more other presentation specifications as described herein. However, in some embodiments, the user interface 1900 may superimpose additional user interface elements upon the image 1902. (Note that this superimposing may also occur in other user interfaces generated as a function of presentation specifications described herein, but is described only with regard to the user interface 1900 for the sake of brevity).

The additional user interface elements may include a file count, a folder label, and other elements superimposed over the image 1902. The additional user interface elements also include a representation of files and folders associated with the selected marker. As illustrated, the additional user interface elements include a horizontal card listing 1906 as described above with regard to the horizontal card listing 1008 of FIG. 10. However, package file presentation elements, such as are illustrated in FIGS. 1-2, 9, 10, and 13-16, may be adapted and/or configured to be superimposed over the image in such instances.

Figure 20:
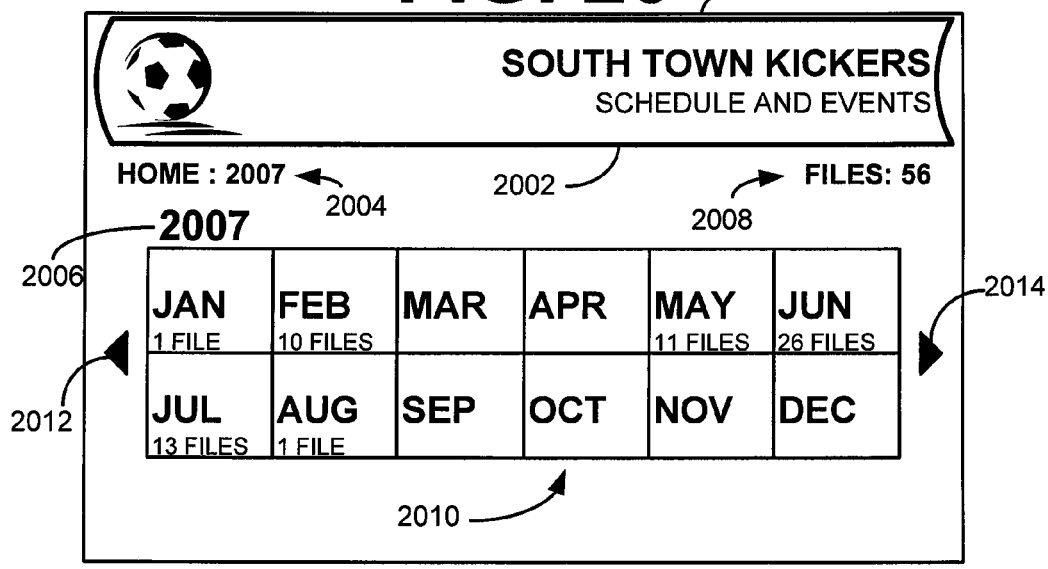
FIG. 20 is a user interface illustration generated as a function of a presentation specification, according to an example embodiment.

FIG. 20 is a user interface 2000 illustration generated as a function of a presentation specification, according to an example embodiment. The user interface 2000 includes a header 2002, a crumbs list element 2004, a folder label element 2006, and a file count element 2008 as illustrated and described with regard to FIG. 8. The user interface 2000 also includes an interactive, animated calendar 2010 that may be navigated using navigation arrows 2012, 2014. The calendar 2010 may be a FLASH® animation or other animation type that allows a user to manipulate and interact with the calendar. The calendar 2010 includes a listing of months associated with a year identified in the folder label. Each month includes a number of content files associated with the month, if any are present in the displayed package file. In some embodiments, when authoring a package file with regard to the calendar 2010, the user associates the content files with a month by dragging and dropping files into the appropriate months to which the content files pertain. In some embodiments, the content files may simply be added to the package file and are automatically associated with a calendar 2010 date by logic included with in the calendar presentation specification as a function of a date defined in metadata of the content files. That date may be a content file saved date, a date the content file is added to the package file, a content file created date, or other date that may be included by default in a file or caused to be added by an author. In some embodiments, an authoring interface provides a mechanism by which a package file author may enter, or otherwise assign, a date to each content file.

Selection of a month within the calendar 2010 may cause a superimposing of additional user interface elements upon the calendar 2010 as described with regard to FIG. 19. In other embodiments, selection of a month may cause the calendar 2010 to modify a detail level at which it is displayed to cause days of the selected month to display. Such an example is illustrated in FIG. 21.

Figure 21:
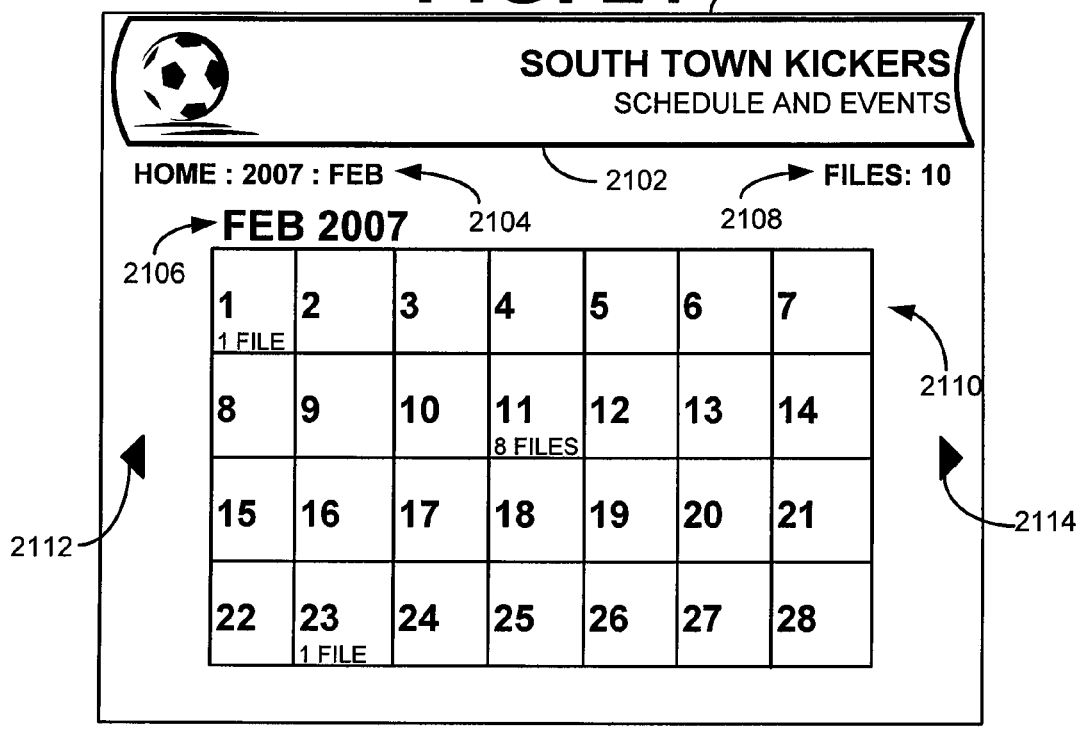
FIG. 21 is a user interface illustration generated as a function of a presentation specification, according to an example embodiment.

FIG. 21 is a user interface 2100 illustration generated as a function of a presentation specification, according to an example embodiment. In some embodiments, the presentation specification that generates the user interface 2100 may be the same presentation specification of FIG. 20. The user interface 2100 includes a header 2102, a crumbs list element 2104, a folder label element 2106, and file count element 2108, as illustrated and described with regard to FIG. 8. The user interface 2100 further includes a calendar 2110. Each date in the calendar 2110 includes a count of content files, if any, associated with the date. The calendar 2110 may be navigated using navigation arrows 2112, 2114. Further user interfaces may be presented based on a calendar at greater or lesser granularities as desired by a package file author or, in some embodiments, as selected for viewing by a viewing user. Selection of a date in the calendar 2110 may cause a horizontal card listing 1008 as illustrated in FIG. 10 to be displayed, or another user interface providing further granularity of the content files with respect to a date and/or time associated with the content file or a differing view of the content files associated with the specific date.

Figure 22:
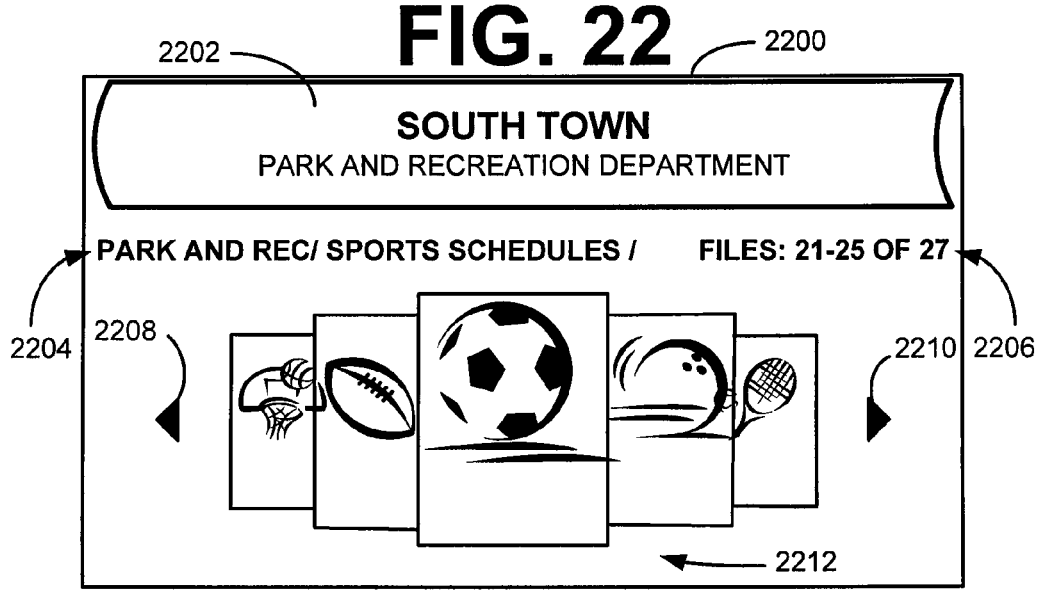
FIG. 22 is a user interface illustration generated as a function of a presentation specification, according to an example embodiment.

FIG. 22 is a user interface 2200 illustration generated as a function of a presentation specification, according to an example embodiment. The user interface includes a header 2202, a crumbs list element 2204, and a file count element 2206, as described above with regard to FIG. 8. The user interface 2200 further includes a carousel view 2212 of content files included in a package file being viewed. The carousel view 2212 includes a card, as described above, defined in an item renderer that is instantiated a number of times by an item viewer. The number of times the item renderer is instantiated may be an author or a user configuration setting; a dynamic, programmatic setting as a function of available resources, such as memory and processing resources, on a computing device displaying the user interface; or may be hard coded. In some embodiments, the number of cards displayed is five. A view of the cards may be traversed using navigation arrows 2208, 2210. As the view of cards is traversed, the item viewer keeps track of a position within a list of content files displayed and moves metadata of the content files into and out of item renderers as described above.

The carousel view 2212 of the user interface 2200 provides an animated view as if the cards are rotating through the display in a circular fashion. A foreground card is displayed centered and largest. A card on each of the right and left sides of the foreground card are displayed smaller and at a rotated perspective to appear as if they are facing in the direction of viewers at different locations. The cards at a next level are displayed smaller yet and appear as if they are facing in the direction of viewers at further different locations. This continues until a total number of cards are rendered by item renderers. The number of cards displayed will typically be an odd number of cards, but if the there are fewer content files to be represented than a number of card to display, the number of visible cards may be an even number.

Figure 23:
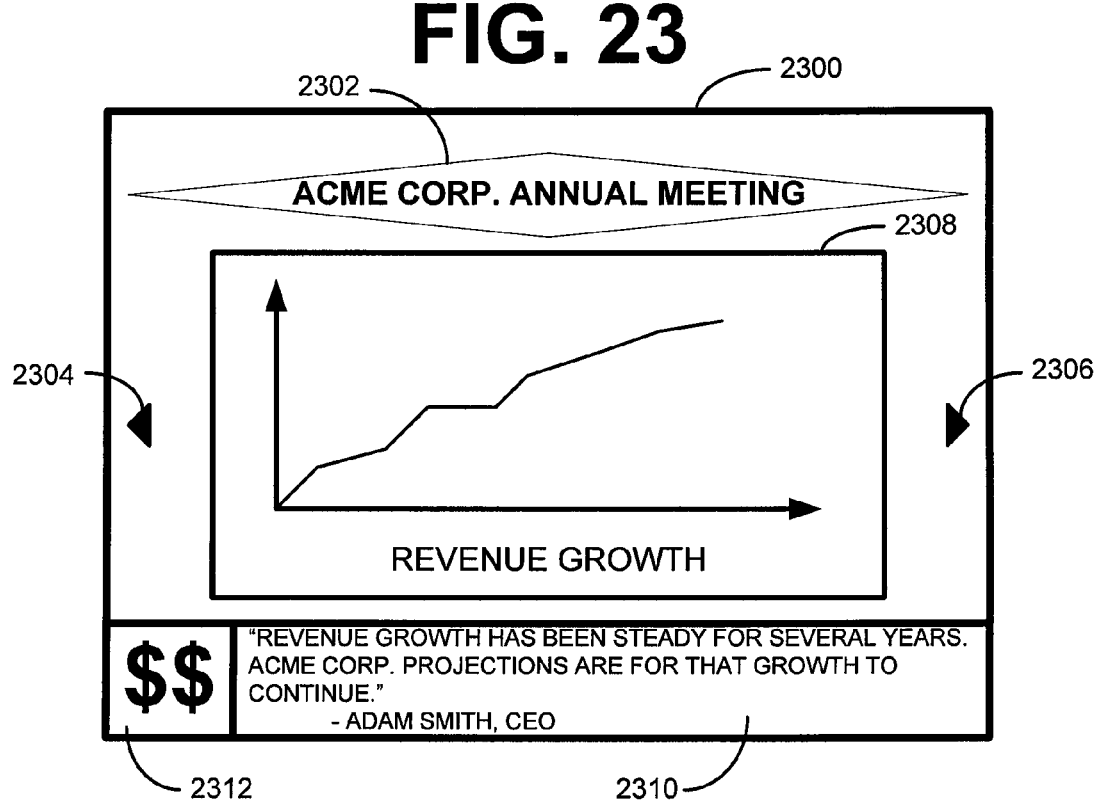
FIG. 23 is a user interface illustration generated as a function of a presentation specification, according to an example embodiment.

FIG. 23 is a user interface 2300 illustration generated as a function of a presentation specification, according to an example embodiment. The user interface 2300 includes a header 2302, a viewing area 2308, and navigation arrows 2304, 2306. The user interface 2300 may also include a footer note area 2310 and a footer image area 2312. The viewing area 2308 is operable to display still and moving images, animation files, and other media content in synchronization with textual descriptions within the footer note area 2310 and images, such as an image, animation, or video of a speaker, in the footer image area 2312. Such a user interface may used to author a presentation of content along with commentary to viewers.

Figure 24:
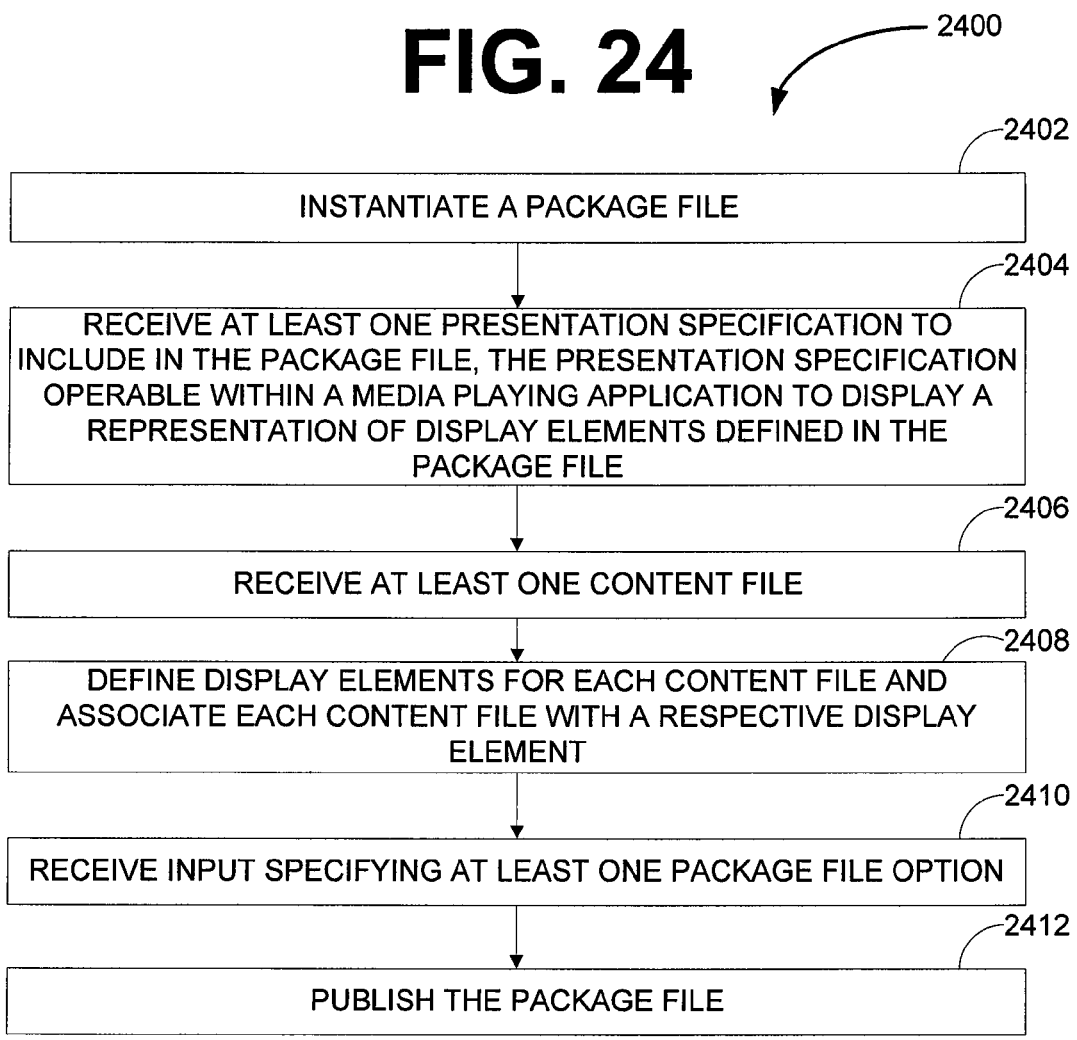
FIG. 24 is a block flow diagram of a method, according to an example embodiment.

FIG. 24 is a block flow diagram of a method 2400, according to an example embodiment, of authoring a package file, including a presentation specification for displaying at least one view of content items included in the package file. The method 2400, in some embodiments, includes instantiating 2402 a package file, receiving 2404 at least one presentation specification to include in the package file, the presentation specification operable within a media playing application to display a representation of display elements defined in the package file, and receiving 2406 at least one content file. The method 2400 further includes defining 2408 display elements for each content file and associating each content file with a respective display element. The method 2400 then includes receiving 2410 input specifying at least one package file option and then publishing 2412 the package file.

In some embodiments, the package file options include one or more options, such as display options, which when configured define elements of one or more presentation specification views. The element of the one or more presentation specification views may include one or more of a cover page or welcome view, a header to be included in one or more presentation specification views, the content of the header, and data identifying a color scheme for at least one presentation specification view.

In some embodiments, publishing 2412 the package file includes embedding within the package file the content files, the presentation specification, the defined display elements and associations, and other received data specifying the package file options. The publishing 2412 may then include storing the package file, such as on a local storage device or on a server accessible over a network or distributing the package file via email, a collaboration server, or via other mechanisms or media.

Figure 25:
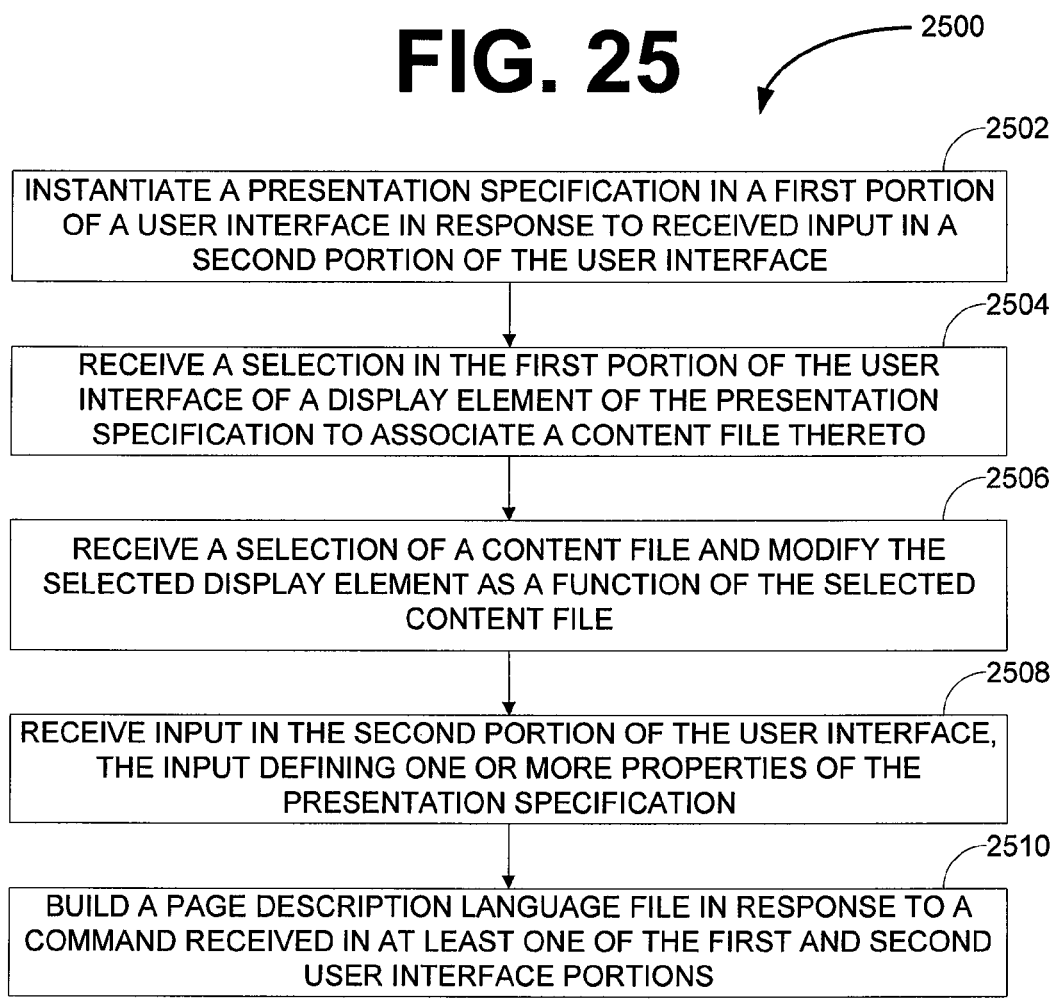
FIG. 25 is a block flow diagram of a method, according to an example embodiment.

FIG. 25 is a block flow diagram of a method 2500 according to an example embodiment. The method 2500 may be used to create or modify package files. The method 2500 includes instantiating 2502 a presentation specification in a first portion of a user interface in response to received input in a second portion of the user interface and receiving 2504 a selection in the first portion of the user interface of a display element of the presentation specification to associate a content file thereto. The method 2500 further includes receiving 2506 a selection of a content file, modifying the selected display element as a function of the selected content file, and receiving 2508 input in the second portion of the user interface, the input defining one or more properties of the presentation specification. The method 2500 then includes building 2510 a page description language file in response to a command received in at least one of the first and second user interface portions. The page description language file may include (or at least be associated with) the presentation specification, the content file (e.g., as embedded therein), and a representation of the association of the content file to the display element of the presentation specification. The package file may further include (or at least be associated with) data representative of the input defining the one or more properties of the presentation specification.

In some embodiments, the presentation specification includes instructions executable within a page description language reader application to cause the presentation specification to be instantiated and displayed within a graphical user interface of the page description language reader application. The presentation specification may further include instructions executable within the page description language reader application to modify an appearance of the displayed presentation specification in response to one or more events.

Figure 26:
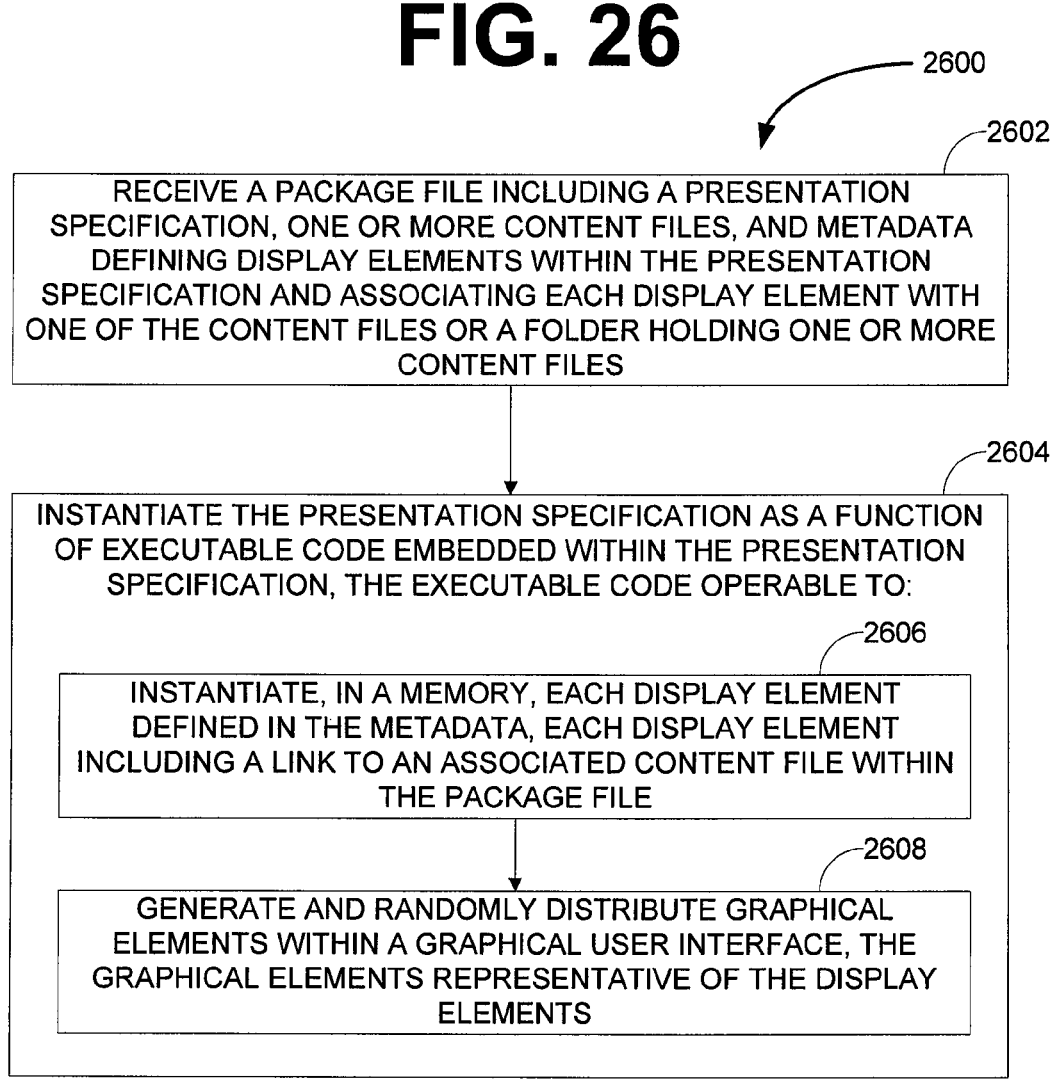
FIG. 26 is a block flow diagram of a method, according to an example embodiment.

FIG. 26 is a block flow diagram of a method 2600, according to an example embodiment of generating a view of at least a portion of a package file as a function of a presentation specification. The method 2600 includes receiving 2602 a package file including a presentation specification, one or more content files, and metadata defining display elements within the presentation specification and associating each display element with one of the content files or a folder holding one or more content files. The method 2600 further includes instantiating 2604 the presentation specification as a function of executable code embedded within the presentation specification. In some embodiments, the executable code within the presentation specification is executable to instantiate 2606, in a memory, each display element defined in the metadata. Each display element may include a link to an associated content file within the package file. The code of the presentation specification may be further executed to generate 2608 and distribute (e.g. randomly or quasi-randomly) graphical elements within a graphical user interface where the graphical elements are representative of the display elements. In some embodiments, the presentation specification may include one or more media elements operable within a media player interface of an application adapted to display the package file. The media elements may be operable within the media player to display the display elements defined in the metadata. The media player interface, in some embodiments, is a FLASH® enabled interface.

In some embodiments, the executable code embedded within the presentation specification may be further executed to receive, in an original view of the graphical user interface, input selecting a graphical element representative of a first display element and to zoom in to a larger view in response to the input selecting the graphical element representative of the first display element. The code, in some embodiments, is further operable to receive a second input to deselect the graphical element of the first display element and to zoom out to the original view.

Figure 27:
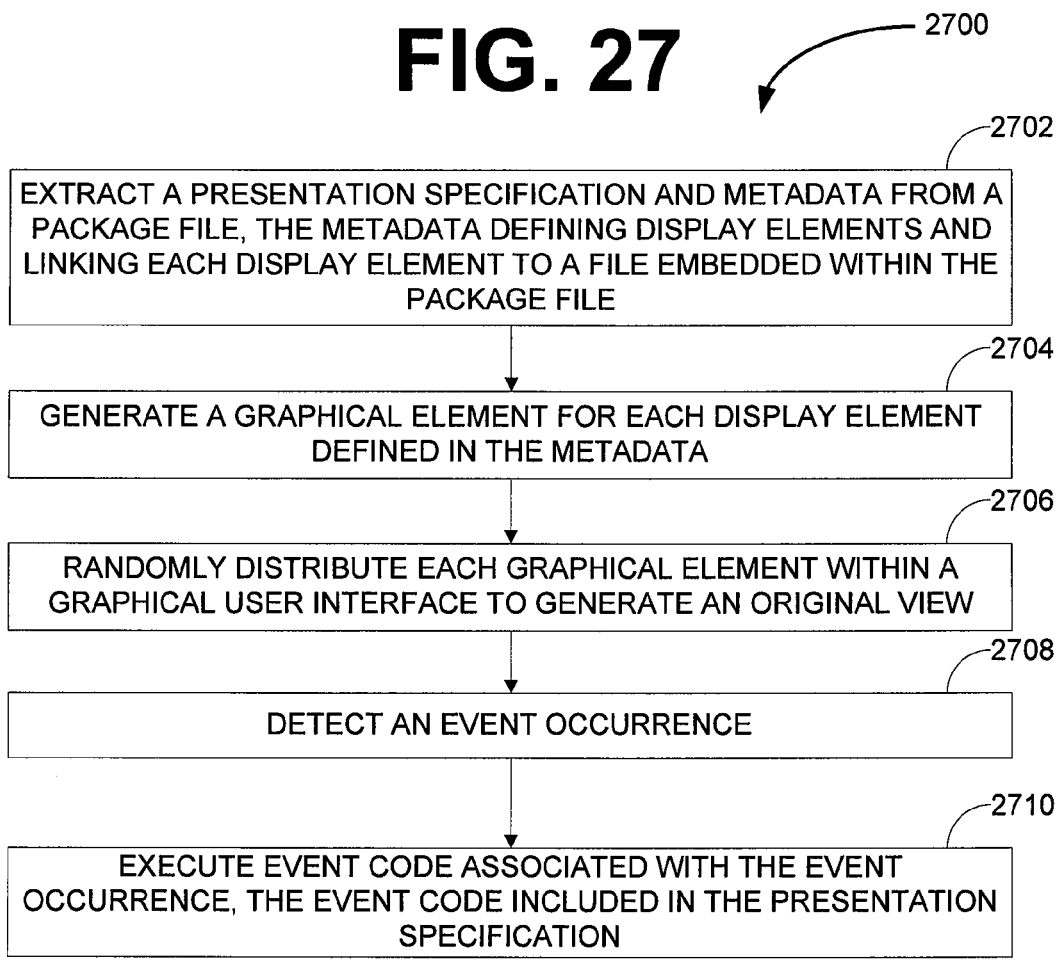
FIG. 27 is a block flow diagram of a method, according to an example embodiment.

FIG. 27 is a block flow diagram of a method 2700 according to an example embodiment. The method 2700 includes extracting 2702 a presentation specification and metadata from a package file. The metadata defines display elements and links each display element to a content file embedded within the package file. The method 2700 includes generating 2704 a graphical element for each display element defined in the metadata. The method 2700 further includes randomly or quasi-randomly distributing 2706 each graphical element within a graphical user interface to generate an original view and detecting 2708 an event occurrence. The method 2700 then includes executing 2710 an event code associated with the event occurrence, the event code included in the presentation specification. In some embodiments, the event occurrence is a selection of a first graphical element and the event code is operable to zoom in to a larger view of the first graphical element within the graphical user interface, receive a second input to deselect the graphical element of the first display element, and to zoom out to the original view.

Figure 28:
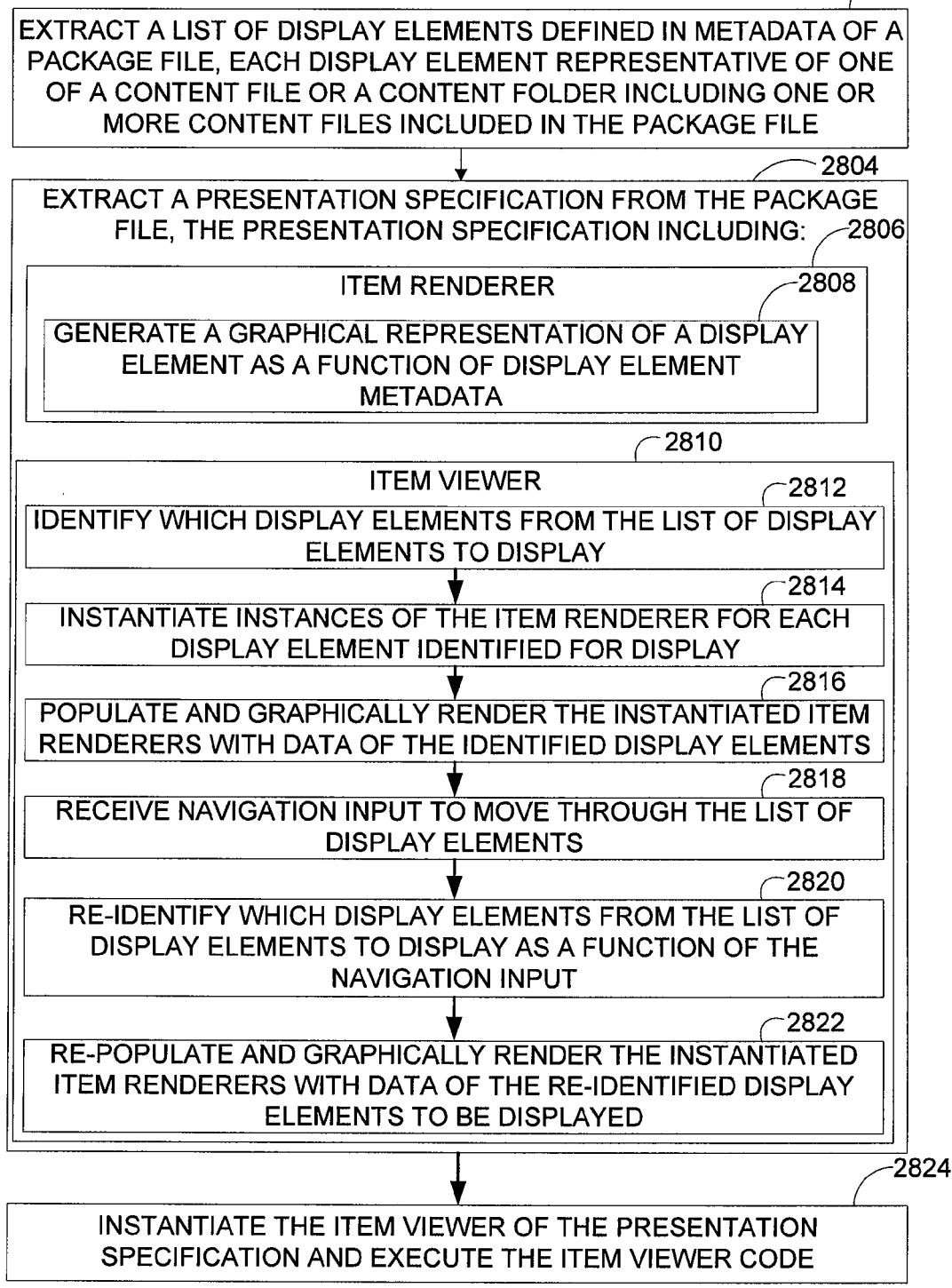
FIG. 28 is a block flow diagram of a method, according to an example embodiment.

FIG. 28 is a block flow diagram of a method 2800, according to an example embodiment, of instantiating a presentation specification of a package file. The method 2800 includes extracting 2802 a list of display elements defined in the metadata of a package file, each display element representative of one of a content file or a content folder including one or more content files included in the package file, and extracting 2804 a presentation specification from the package file. The method 2800 further includes instantiating 2824 an item viewer of the presentation specification and executing item viewer code. Content files and content folders are referred to collectively as content items.

The presentation specification, in some such embodiments, includes an item renderer 2806 including executable code operable to generate 2808 a graphical representation of a display element as a function of the display element metadata. The presentation specification in such embodiments also includes an item viewer 2810 including executable code to identify 2812 which display elements from the list of display elements to display and to instantiate 2814 instances of the item renderer for each display element identified for display. The presentation specification code may be further executable to populate 2816 and graphically render the instantiated item renderers with data of the identified display elements. The code of the item viewer may also be further operable to receive 2818 navigation input to move through the list of display elements, to re-identify 2820 which display elements from the list of display elements to display as a function of the navigation input, and to re-populate 2822 and graphically render the instantiated item renderers with data of the re-identified display elements to be displayed.

In some embodiments, the item viewer further includes animation code operable to generate and graphically render a transition animation from a first view of the instantiated item renderers to a repopulated view of the instantiated item renderers following receipt of the navigation input. The item viewer 2810 may further include a synchronization code operable to communicate synchronization data to display modules to synchronize a view of the display modules with a view within the item viewer.

In some embodiments, the presentation specification also includes one or more navigation-aid display modules. Each navigation-aid display module may include code operable to generate and graphically render a navigation-aid display of a position within the list of display elements of the package file and receive synchronization data from the item viewer identifying at least one display element from the list of display elements displayed within the item viewer. The navigation-aid display module may further include code operable to modify the navigation-aid display of the position within the list of display elements of the package file as a function of the synchronization data received from the item viewer. The navigation-aid display modules also may include code operable to receive input identifying a different position within the navigation-aid display to navigate to within the list of display elements displayed by the item viewer and communicate the identified different position to the item viewer as the navigation input.

In some embodiments of the method 2800 performed by item renderers, the method 2800 includes identifying an event occurrence with regard to an instantiated item renderer and modifying a graphical appearance of the instantiated item renderer as a function of the identified event. In some embodiments, the identified event may be a received focus event and the modified graphical appearance of the instantiated item renderer is an alternate graphical representation of the instantiated item renderer. In some other embodiments, the identified event is a selection of the instantiated item renderer and the item renderer code is further executable to open and display the display element that the instantiated item renderer represents. The selection of the instantiated item renderer may be a selection of a display element representative of a content folder including one or more display elements representative of content file display elements. In some embodiments, the item viewer code may be operable to move the item renderer to a background view, to identify which display elements from the list of display elements in the content folder to display, and to instantiate second instances of the item renderer for each display element identified in the content folder for display. In some embodiments, the item viewer code is also operable to populate and graphically render, in a foreground view, the instantiated second instances of the item renderer.

Figure 29:
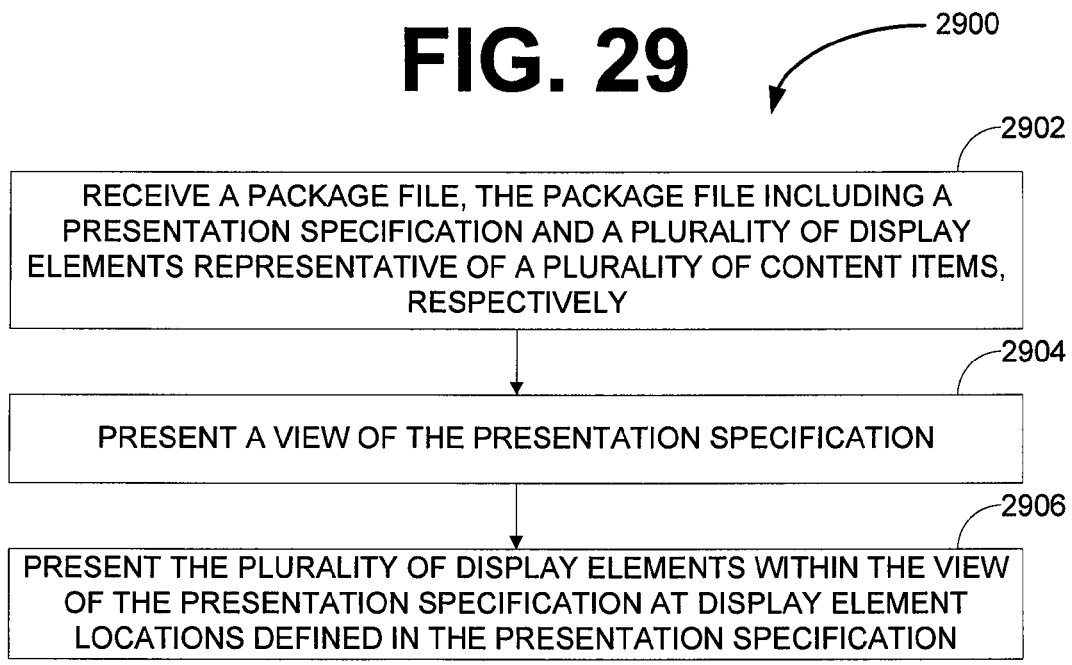
FIG. 29 is a block flow diagram of a method, according to an example embodiment.

FIG. 29 is a block flow diagram of a method 2900, according to an example embodiment. The method 2900 includes receiving 2902 a package file, the package file including a presentation specification and a plurality of display elements representative of a plurality of content items, respectively. The method 2900 also includes presenting 2904 a view of the presentation specification and presenting 2906 the plurality of display elements within the view of the presentation specification at display element locations defined in the presentation specification. In some embodiments, the method 2900 further includes receiving a selection of a presented display element and presenting a view of a content item associated with the selected display element. In some embodiments of the method 2900, the content item associated with the selected display element includes an association to a second presentation specification and a second plurality of display elements representative of a second plurality of content items. Further, the presented view of the selected content item includes presenting a view of the second presentation specification and the second plurality of display elements within the view of the second presentation specification.

In some embodiments, the view of the presentation specification is presented as a function of at least one media element, such as a FLASH® animation, included within the presentation specification.

Figure 30:
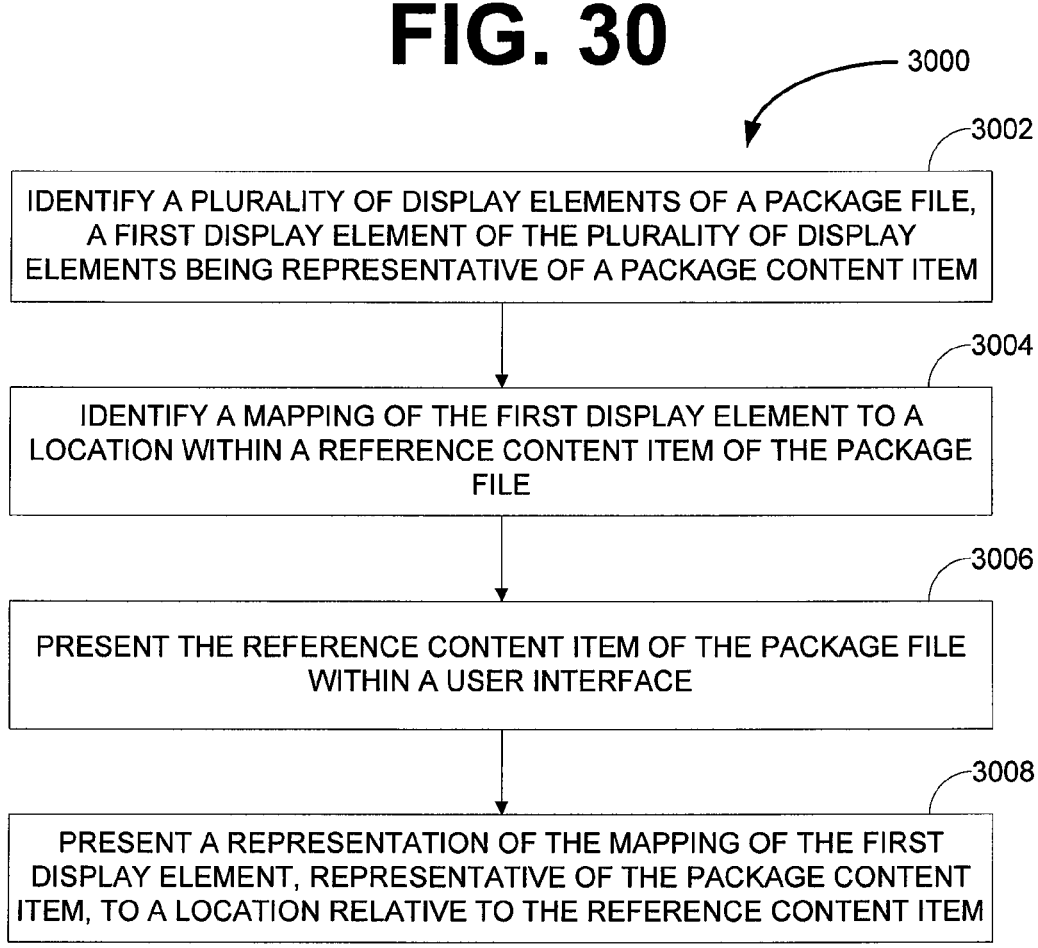
FIG. 30 is a block flow diagram of a method, according to an example embodiment.

FIG. 30 is a block flow diagram of a method 3000, according to an example embodiment. The method 3000 is an example method of presenting a display element at a location within a reference content item as a function of a mapping. The method 3000 includes identifying 3002 a plurality of display elements of a package file, a first display element of the plurality of display elements being representative of a package content item and identifying 3004 a mapping of the first display element to a location within a reference content item of the package file. The method 3000 further includes presenting 3006 the reference content item of the package file within a user interface and presenting 3008 a representation of the mapping of the first display element, representative of the package content item, to a location relative to the reference content item. In some embodiments, the reference content item includes a media content item, such as one or more of a video, an animation, an image, an audio clip, and the like. In some embodiments, the media content item is an animation responsive to received user input to modify how the animated image is displayed. The animation, in some embodiments, is an animated calendar and the mapping of the first display element to a location within the reference content item includes a date.

In some embodiments, the reference content item is an animated image including a map. The map, in some embodiments, includes geospatial or other location metadata defining addressable locations within the map and the mapping of the first display element to a location within the reference content item is defined in the metadata as geospatial coordinates relative to the geospatial metadata of the map.

In some embodiments of the method 3000, the package content item of the first display element is representative of a content item that provides detail information with regard to the mapped portion of the reference content item image. Such embodiments of the method 3000 may further include receiving a selection of the first display element within the first display element presented within the presented reference content item and presenting the package content item represented by the first display element within the user interface.

Figure 31:
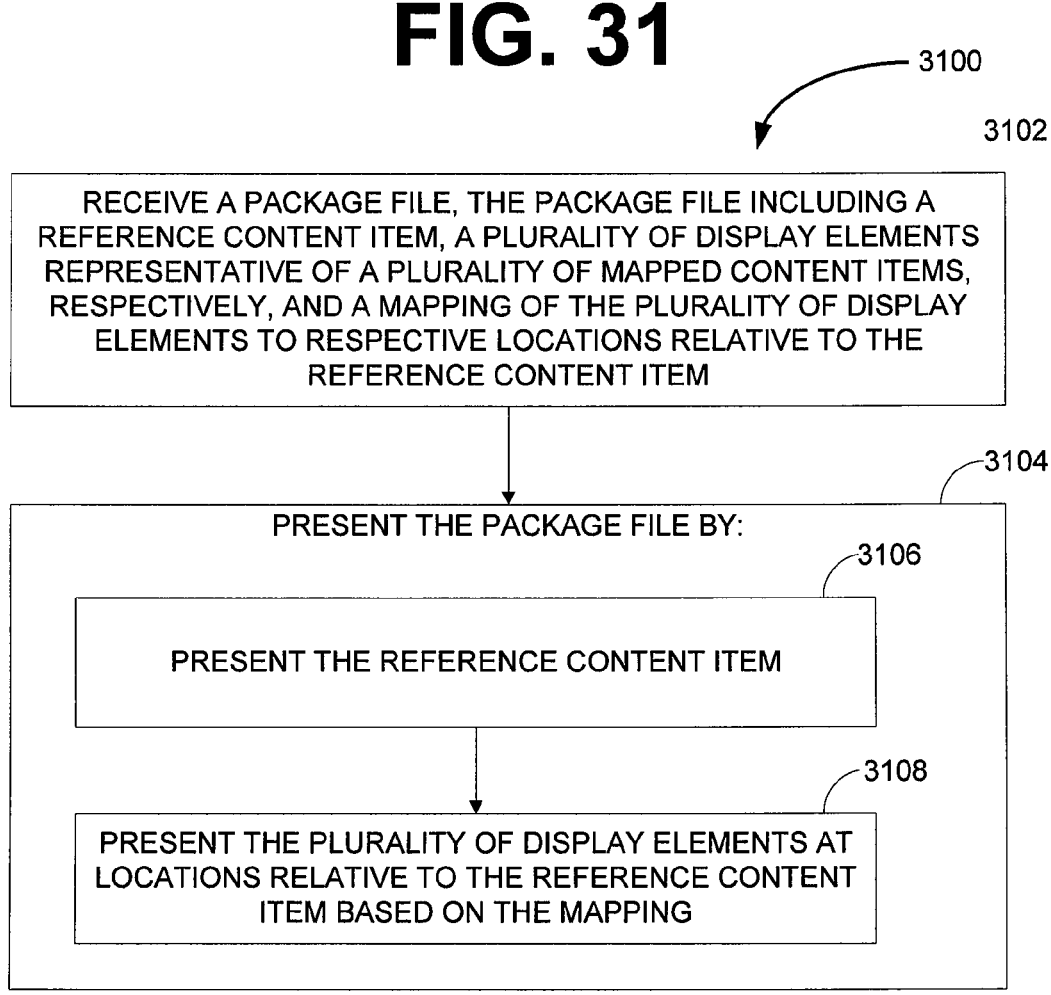
FIG. 31 is a block flow diagram of a method, according to an example embodiment.

FIG. 31 is a block flow diagram of a method 3100, according to an example embodiment. The method 3100 is a method of generating a display of a reference content item and presenting a view of display elements at locations relative to mappings of display elements to content item locations. The method 3100 includes receiving 3102 a package file, the package file including a reference content item, a plurality of display elements representative of a plurality of mapped content items, respectively, and a mapping of the plurality of display elements to respective locations relative to the reference content item. The method 3100 further includes presenting 3104 the package file by presenting 3106 the reference content item and presenting 3108 the plurality of display elements at locations relative to the reference content item based on the mapping. In some embodiments, the reference content item is contextually relevant to the content of the plurality of mapped content items and a mapping of a first display element of the plurality of display elements to a first location relative to the reference content item is indicative of subject matter of a first mapped content item associated with the first display element. In some such embodiments, the graphical reference image is a geographical reference image, and the mapping of the first display element is indicative of a geographical relevance of the first mapped content. A process reference image representative of a process may be in the reference image, and the mapping of the first display element is indicative of a contextual relevance of the first mapped content to an operation of the process. In other instances, or embodiments, the reference image may be a temporal reference image representative of a temporal sequence, and the mapping of the first display element is indicative of a contextual relevance of the first display element to a temporal location. In some embodiments, the temporal reference image is an image of at least a portion of a calendar.

Figure 32:
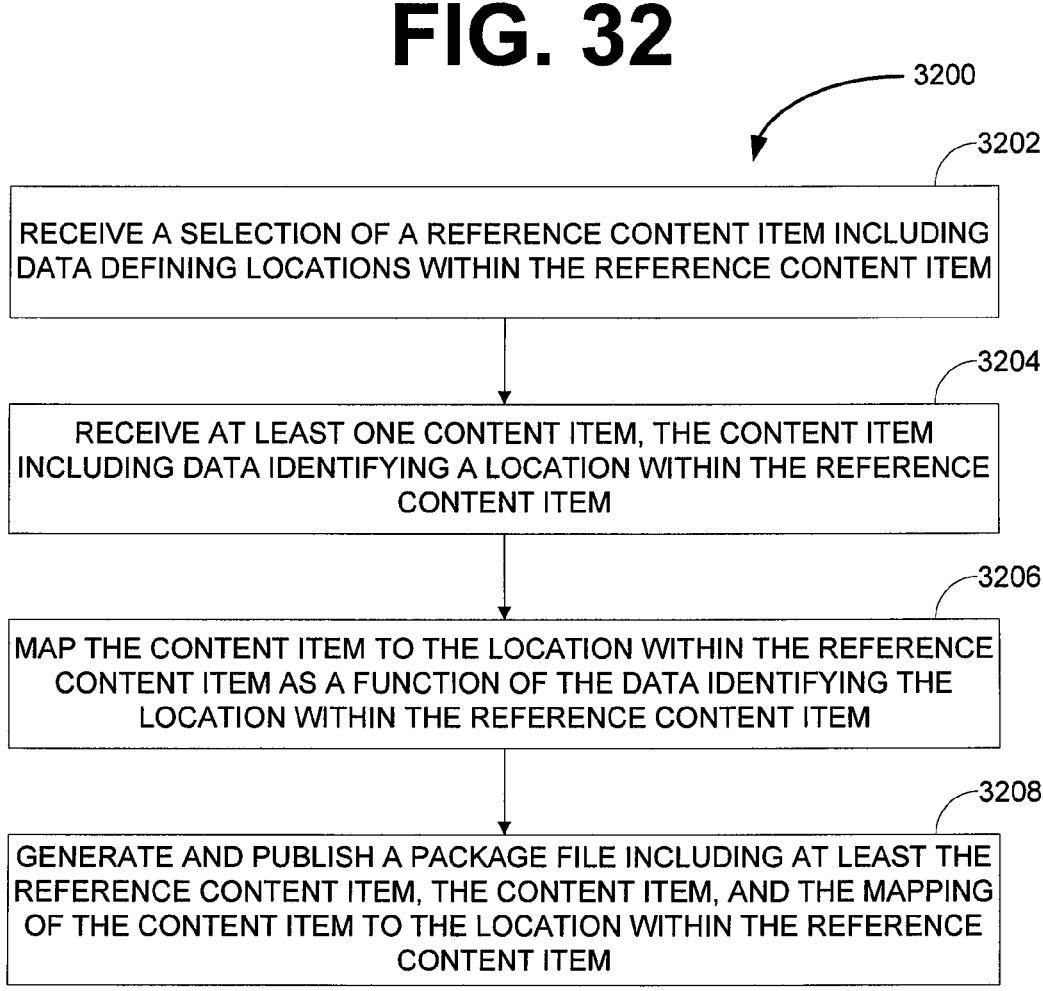
FIG. 32 is a block flow diagram of a method, according to an example embodiment.

FIG. 32 is a block flow diagram of a method 3200, according to an example embodiment. The method 3200 is a method of authoring a package file including mappings of content item display elements to locations within a reference content item. The method 3200 includes receiving 3202 a selection of a reference content item including data defining locations within the reference content item and receiving 3204 at least one content item, the content item including data identifying a location within the reference content item. In some embodiments, the method 3200 further includes mapping 3206 the content item to the location within the reference content item based on the data identifying the location within the reference content item and generating 3208 and publishing a package file including at least the reference content item, the content item, and the mapping of the content item to the location within the reference content item. In some embodiments, publishing the package file includes storing the generated package file on a computer readable medium. The reference content item may include an animated media file displayable within a media presentation interface, such as a Flash® enabled user interface.

Figure 33:
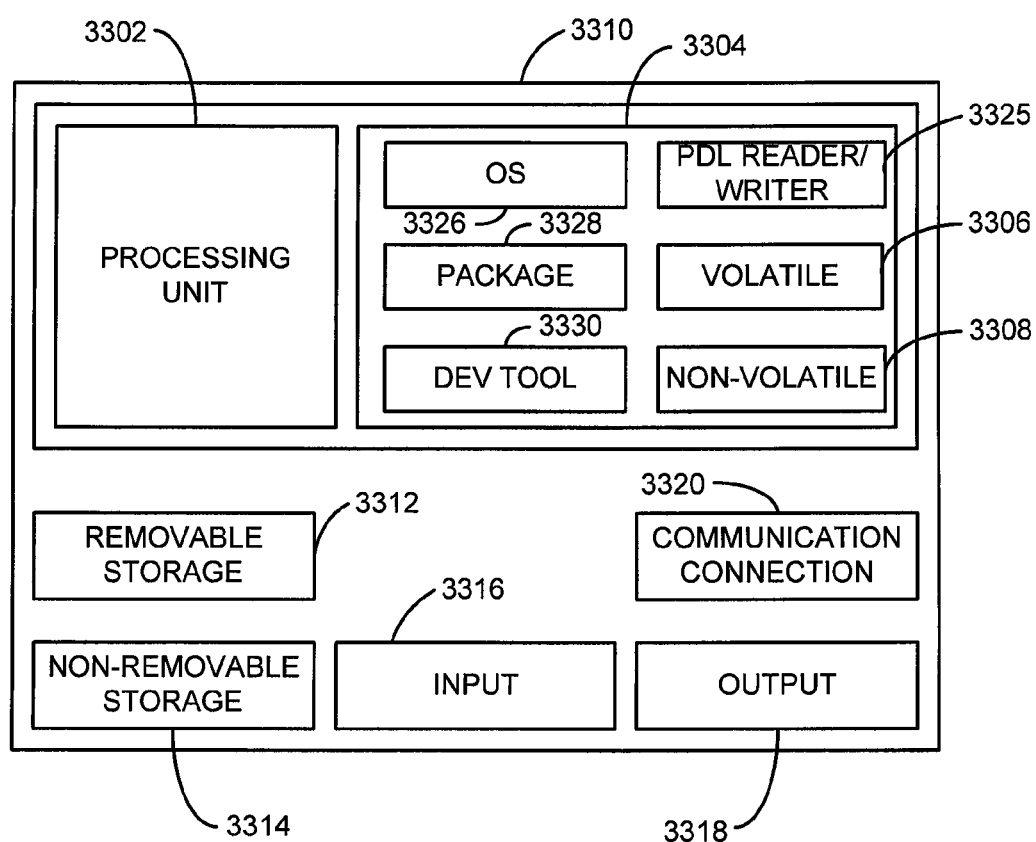
FIG. 33 is a block diagram of a computing device, according to an example embodiment.

FIG. 33 is a block diagram of a computing device, according to an example embodiment. One example computing device in the form of a computer 3310 may include a processing unit 3302, memory 3304, removable storage 3312, and non-removable storage 3314. Memory 3304 may include volatile memory 3306 and non-volatile memory 3308. Computer 3310 may include, or have access to, a computing environment that includes a variety of computer readable media, such as volatile memory 3306 and non-volatile memory 3308, removable storage 3312 and non-removable storage 3314. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 3310 may include, or have access to, a computing environment that includes input 3316, output 3318, and a communication connection 3320. The computer may operate in a networked environment using the communication connection 3320 to connect to one or more remote computers, such as database servers. The remote computer may include a PC, server, router, network PC, a peer device or other common network display element, or the like. The communication connection may include a Local Area Network (LAN), a Wide Area Network (WAN), the Internet, or other networks.

Computer-readable instructions stored on a computer readable medium are executable by the processing unit 3302 of the computer 3310. A hard drive, CD-ROM, and RAM are some examples of articles including a computer readable medium. The computer-readable instructions typically include an operating system 3326 and a page description language document reader application 3325, which may also include the ability to write page description language documents. The computer-readable instructions may also include one or more applications, which may be used to create and open content files packaged within page description language documents, such as package file 3328, and a development tool 3330, which may be used to create presentation specifications.

An example of the page description language document reader application 3325 is the ADOBE® ACROBAT® program available from ADOBE SYSTEMS INCORPORATED of San Jose, Calif. An example of the development tool 3330 is the ADOBE® FLEX™ program that is also available from ADOBE SYSTEMS INCORPORATED. The FLEX™ program is a cross-platform development tool and framework for creating rich applications. Flex may be used to create presentation specifications.

In typical embodiments, the computer 3310 includes a page description language document, such as package file 3328, including one or more content files. The package file 3328 may be stored in storage 3312, 3314, held in memory 3304, downloaded over the communication connection 3320, created using the page description language writer application 3325, or created, stored, or received via another means. The package file 3328, in some embodiments, may include a presentation specification including a presentation display element for each of the one or more content files. In some such embodiments, the page description language reader application 3325 is operable to present a view of at least a portion of the package file 3328 as a function of the metadata and the presentation specification. The presentation specification, when instantiated within a user interface of the page description language reader application 3325, may be responsive to actions of a user. The actions of a user may include gestures made within the user interface with a pointing device. The presentation specification, in response to a user action, may cause one or more content files of the package file 3328 to be extracted and representations of the extracted content file to be displayed. Such a package file representation typically includes at least a portion of the associated metadata describing a content file.

In some embodiments, the page description language reader application 3325 includes one or more default presentation specifications capable of displaying at least a portion of the metadata of package file 3328. For example, a default presentation specification, when selected by a user, such as through a menu option, may display data selected from the metadata including file name, file size, and a last saved date of each content file packaged within a page description language document. In some embodiments, a package file 3328 may include a reference to a presentation specification for use in displaying at least a portion of the package file. In such instances, the presentation specification may not be included. The reference to the presentation specification may be a reference to a presentation specification included with the page description language reader application 3325 or provide a reference to a network location, such as an Internet location via a URL, from which the presentation specification may be downloaded for use. In some embodiments, when a presentation specification is downloaded, the page description language reader application 3325 may cache a copy of the presentation specification so it will not have to be downloaded again should another package file reference the same presentation specification.

In some embodiments, the presentation specification, when instantiated within the page description language document reader application 3325, may invoke one or more methods of a system plug-in operable within the page description language document reader application. In some embodiments, the plug-in may be the FLASH® Player plug-in available from ADOBE SYSTEMS INCORPORATED.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. One or more non-transitory computer-readable storage devices, with instructions thereon, which when executed, cause a computer to:
   receive a package file comprising a page description language document, the package file including a presentation specification, a plurality of content files, and a plurality of display elements associated with the plurality of content files, wherein the presentation specification includes event code;
   render a first portion of the plurality of display elements in a distributed manner within a first graphical user interface of a presentation application in accordance with the presentation specification;
   detecting a selection of a first display element of the first portion of the plurality of display elements; and
   based on the selection of the first display element, execute the event code included in the presentation specification to render a second portion of the plurality of display elements within a second graphical user interface of the presentation application configured to display content files, the second portion of the plurality of display elements comprising content files, from one or more of the plurality of content files from the package file and associated with the second portion of the plurality of display elements, presented in the second graphical user interface in accordance with the presentation specification.

2. The one or more computer-readable storage devices of claim 1, wherein the instructions which cause the computer to render the first portion of the plurality of display elements in a distributed manner cause the display elements to be distributed to appear as if the display elements are randomly distributed.

3. The one or more computer-readable storage devices of claim 1, wherein the presentation specification includes executable code executable by a player component associated with the presentation specification to render the first and second portions of the plurality of display elements.

4. The one or more computer-readable storage devices of claim 3, wherein the code is further executable to:
   receive, in an original view of the first graphical user interface, a first input regarding the first display element representative of a first content file, the first input comprising hovering over the first display element or a single click on the first display element; and
   zoom in to a larger view of the first display element in response to the first input regarding the first display element.

5. The one or more computer-readable storage devices of claim 4, wherein each of the first portion of the plurality of display elements is user-selectable to invoke presentation of an associated content file.

6. The one or more computer-readable storage devices of claim 1, wherein the code is further executable to:
   receive, in an original view of the first graphical user interface, a first input regarding the first display element associated with a first content file, the first input comprising hovering over the first display element, a single click on the first display element, or directing focus to the first display element;
   transition to a new view of the first display element in response to the first input regarding the first display element; and
   receive further input selecting the first display element in the new view.

7. The one or more computer-readable storage devices of claim 6, further comprising cause audio to play in response to the first input regarding the first display element, and wherein transitioning to a new view of the first display element comprises at least one of an animation, zooming in to a larger view of the first display element, and presenting textual descriptions associated with the first display element.

8. The one or more computer-readable storage devices of claim 1 further comprising:
   detecting a selection of a second display element of the first portion of the plurality of display elements; and
   based on the selection of the second display element, execute the event code included in the presentation specification to render a third portion of the plurality of display elements within a third graphical user interface of the presentation application, the third portion of the plurality of display elements comprising content, from one or more of the plurality of content files from the package file and associated with the third portion of the plurality of display elements, presented in the third graphical user interface in accordance with the presentation specification,
   wherein the third graphical user interface is defined in a manner independent of the second graphical user interface.

9. The one or more computer-readable storage devices of claim 1, wherein the code embedded within the presentation specification is further executable to:
   modify an appearance of the first display element within the graphical user interface while the first graphical element has focus.

10. The one or more computer-readable storage devices of claim 9, wherein the modified appearance of the first display element when the first display element has focus includes a display of an action button, the selection of which triggers a data processing action with regard to the content file associated with the first display element.

11. The one or more computer-readable storage devices of claim 1, wherein the package file is a page description language file.

12. The one or more computer-readable storage devices of claim 1, wherein the presentation specification includes a media element within a media player interface of an application adapted to display the package file, the media element when displayed including a display of package file display elements.

13. A method comprising:
extracting a first presentation specification and metadata from a package file comprising a page description language document, the metadata defining display elements and linking each display element to a file embedded within the package file, wherein the first presentation specification defines locations for a first set of the display elements, and wherein a first display element of the first set of display elements is associated with a second presentation specification within the package file and a second display element of the first set of display elements is associated with a third presentation specification within the package file, wherein the second presentation specification defines locations for a second set of the display elements and wherein the third presentation specification defines the locations for a third set of display elements;
generating a graphical element for each display element defined in the metadata;
distributing each display element of the first set of the display elements within a first graphical user interface to generate an original view in accordance with the first presentation specification;
detecting a selection event occurrence comprising a selection of the first display element;
executing event code associated with the selection event occurrence, the event code included in the package file to distribute each display element of the second set of the display elements within a second graphical user interface configured to display content files in accordance with the second presentation specification, the second set of the display elements comprising content files from a file embedded in the package file linked to the selected first display element;
detecting a selection event occurrence comprising a selection of the second display element; and
executing the event code associated with the selection event occurrence for the second display element, the event code included in the package file to distribute each display element of the third set of the display elements within a third graphical user interface in accordance with the third presentation specification, the third set of the display elements comprising content from the file embedded in the package file linked to the selected second display element.

14. The method of claim 13, further comprising detecting an input event occurrence wherein the input event occurrence comprises a first input regarding the first display element, the first input comprising hovering over the first display element, a single click on the first display element, or directing focus to the first display element, the event code to:
zoom in to a larger view of the first display element within the first graphical user interface;
receive a second input regarding the first display element, the second input comprising not hovering over or not directing focus to the first display element or a single click on another display element; and
zoom out to the original view.

15. The method of claim 13, further comprising detecting an input event occurrence wherein the input event occurrence comprises a first input regarding the first display element, the first input comprising hovering over the first display element, a single click on the first display element, or directing focus to the first display element, the event code to cause the first graphical user interface to:
zoom in to a larger view of the first display element; and
receive further input selecting the first display element in the larger view.

16. The method of claim 13 further comprising detecting an input event occurrence, wherein the input event occurrence is a focus event with regard to the first display element, the event code to:
modify an appearance of the first display element while the first display element maintains focus.

17. The method of claim 16, wherein the modified appearance of the first display element includes a display of an action button, the selection of which triggers a data processing action with regard to the content file associated with the first display element.

18. A system comprising:
a bus;
a memory coupled to the bus;
a processor coupled to the bus;
a package display module stored in the memory and executable by the processor to:
extract a presentation specification from a package file also including content files, metadata, and a collaboration session identifier to identify a collaboration session enabling collaboration of one or more other users, the presentation specification including
a first code executable to generate a first graphical representation of the content files as a function of the metadata which associates each content file to a display element within the presentation specification, the first graphical representation including:
a first portion of display elements, each display element defined in the metadata; and
a graphical distribution of the first portion of the display elements within a portion of a first graphical user interface; and
a second code executable to generate a second graphical representation of content from a content file, the second graphical representation including:
a second portion of display elements comprising content files; and
a graphical distribution of the second portion of the display elements within a portion of a second graphical user interface configured to display content files.

19. The system of claim 18, wherein the presentation specification further includes event code executable by the processor upon defined event occurrences to modify an appearance of the first or second graphical user interface.

20. The system of claim 19, wherein a first event occurrence is a selection of a first graphical element within the first or second graphical user interface, the event code executable by the processor to:
zoom in to a larger view of the first display element within the first or second graphical user interface.

21. The system of claim 19, wherein a first event occurrence is a selection of a first display element, the event code to:
   execute the second code, wherein the content file is associated with the first display element.

22. The system of claim 21, wherein the content file is displayed within the second graphical user interface.

23. The system of claim 19, wherein a first event occurrence is a focus event with regard to a first display element, the event code executable by the processor to:
   modify an appearance of the first display element while the first display element maintains focus.

24. The system of claim 23, wherein the modified appearance of the first display element includes a display of an action button, the selection of which triggers a data processing action with regard to the content file associated with the first display element.

* * * * *